US 8,676,642 B1

(12) United States Patent
Sheley

(10) Patent No.: US 8,676,642 B1
(45) Date of Patent: Mar. 18, 2014

(54) SYSTEM AND METHOD FOR GRANTING PROMOTIONAL REWARDS TO FINANCIAL ACCOUNT HOLDERS

(75) Inventor: William S. Sheley, Dublin, OH (US)

(73) Assignee: JPMorgan Chase Bank, N.A., New York, NY (US)

(*) Notice: Subject to any disclaimer, the term of this patent is extended or adjusted under 35 U.S.C. 154(b) by 1062 days.

(21) Appl. No.: 12/043,760

(22) Filed: Mar. 6, 2008

Related U.S. Application Data

(60) Provisional application No. 60/948,127, filed on Jul. 5, 2007.

(51) Int. Cl.
G06Q 30/00 (2012.01)
G06Q 10/00 (2012.01)
G06Q 50/00 (2012.01)

(52) U.S. Cl.
CPC ............... *G06Q 30/00* (2013.01); *G06Q 10/00* (2013.01); *G06Q 50/00* (2013.01)
USPC ..................... 705/14.24; 705/14.28; 705/14.3

(58) Field of Classification Search
CPC ........ G06Q 30/00; G06Q 10/00; G06Q 50/00
USPC ..................................... 705/14.24, 4.28, 14.3
See application file for complete search history.

(56) References Cited

U.S. PATENT DOCUMENTS

| | | |
|---|---|---|
| 3,634,669 A | 1/1972 | Soumas et al. |
| 3,713,235 A | 1/1973 | Roberts |
| 3,946,206 A | 3/1976 | Darjany |
| 4,047,033 A | 9/1977 | Malmberg et al. |
| 4,058,220 A | 11/1977 | Torongo |
| D248,203 S | 6/1978 | Morse |
| 4,130,881 A | 12/1978 | Haessler et al. |
| 4,465,206 A | 8/1984 | Sorel et al. |
| 4,545,838 A | 10/1985 | Minkus et al. |
| 4,582,985 A | 4/1986 | Lofberg |
| 4,614,861 A | 9/1986 | Pavlov et al. |
| 4,634,845 A | 1/1987 | Riley |
| 4,643,452 A | 2/1987 | Chang et al. |
| 4,689,478 A | 8/1987 | Hale et al. |
| 4,700,055 A | 10/1987 | Kashkashian, Jr. |
| 4,746,787 A | 5/1988 | Okada |
| 4,750,119 A | 6/1988 | Robertson |

(Continued)

FOREIGN PATENT DOCUMENTS

| | | |
|---|---|---|
| CA | 2293321 | 12/1998 |
| EP | 0843292 A2 | 5/1998 |

(Continued)

OTHER PUBLICATIONS

5500—FDIC General Counsel's Opinion No. 8—Stored Value Cards, 61 Fed. Reg. 40490, http://www.fdic.gov/regulations/laws/rules/5500-500.html, Aug. 2, 1996.

(Continued)

*Primary Examiner* — Daniel Felten
(74) *Attorney, Agent, or Firm* — Hunton & Williams LLP

(57) ABSTRACT

A system and method for offering rewards. The method comprising the steps of: receiving a plurality transaction occurrences from a plurality of merchants relating to at least one account; ordering the plurality of transaction occurrences based on an ordering scheme; selecting a winning transaction from the plurality of transaction occurrences based on a reward selection scheme; and rewarding at least one reward to a user associated with the winning transaction.

15 Claims, 7 Drawing Sheets

(56) References Cited

U.S. PATENT DOCUMENTS

| | | | |
|---|---|---|---|
| 4,752,676 | A | 6/1988 | Leonard et al. |
| 4,754,418 | A | 6/1988 | Hara |
| 4,766,293 | A | 8/1988 | Boston |
| 4,766,539 | A | 8/1988 | Fox |
| 4,789,928 | A | 12/1988 | Fujisaki |
| 4,822,985 | A | 4/1989 | Boggan et al. |
| 4,831,242 | A | 5/1989 | Englehardt |
| 4,831,526 | A | 5/1989 | Luchs |
| 4,837,422 | A | 6/1989 | Dethloff et al. |
| 4,868,376 | A | 9/1989 | Lessin et al. |
| 4,870,259 | A | 9/1989 | Boggan et al. |
| 4,882,675 | A | 11/1989 | Nichtberger et al. |
| 4,897,533 | A | 1/1990 | Lyszczarz |
| D305,887 | S | 2/1990 | Nishimura |
| 4,906,826 | A | 3/1990 | Spencer |
| 4,908,521 | A | 3/1990 | Boggan et al. |
| 4,923,288 | A | 5/1990 | Allen et al. |
| 4,928,001 | A | 5/1990 | Masada |
| 4,941,090 | A | 7/1990 | McCarthy |
| 4,943,707 | A | 7/1990 | Boggan |
| 4,953,085 | A | 8/1990 | Atkins |
| 4,954,985 | A | 9/1990 | Yamazaki |
| 4,961,142 | A | 10/1990 | Elliott et al. |
| 4,968,873 | A | 11/1990 | Dethloff et al. |
| 4,975,840 | A | 12/1990 | DeTore et al. |
| 4,978,401 | A | 12/1990 | Bonomi |
| 4,992,940 | A | 2/1991 | Dworkin |
| 5,025,372 | A | 6/1991 | Burton et al. |
| 5,049,728 | A | 9/1991 | Rovin |
| 5,055,662 | A | 10/1991 | Hasegawa |
| 5,080,748 | A | 1/1992 | Bonomi |
| 5,095,194 | A | 3/1992 | Barbanell |
| 5,117,355 | A | 5/1992 | McCarthy |
| 5,146,068 | A | 9/1992 | Ugawa et al. |
| 5,175,416 | A | 12/1992 | Mansvelt |
| 5,177,342 | A | 1/1993 | Adams |
| 5,180,901 | A | 1/1993 | Hiramatsu |
| 5,185,697 | A | 2/1993 | Jacobs et al. |
| 5,191,522 | A | 3/1993 | Bosco et al. |
| 5,192,947 | A | 3/1993 | Neustein |
| 5,202,286 | A | 4/1993 | Nakatani |
| 5,202,826 | A | 4/1993 | McCarthy |
| 5,206,488 | A | 4/1993 | Teicher |
| 5,206,803 | A | 4/1993 | Vitagliano et al. |
| 5,214,700 | A | 5/1993 | Pinkas et al. |
| 5,218,631 | A | 6/1993 | Katz |
| 5,247,190 | A | 9/1993 | Friend et al. |
| 5,276,311 | A | 1/1994 | Hennige |
| 5,287,268 | A | 2/1994 | McCarthy |
| 5,287,269 | A | 2/1994 | Dorrough et al. |
| 5,297,026 | A | 3/1994 | Hoffman |
| 5,311,594 | A | 5/1994 | Penzias |
| 5,326,959 | A | 7/1994 | Perazza |
| 5,326,960 | A | 7/1994 | Tannenbaum |
| 5,328,809 | A | 7/1994 | Holmes et al. |
| 5,339,239 | A | 8/1994 | Manabe et al. |
| 5,349,633 | A | 9/1994 | Katz |
| 5,350,906 | A | 9/1994 | Brody et al. |
| 5,359,183 | A | 10/1994 | Skodlar |
| 5,361,062 | A | 11/1994 | Weiss et al. |
| 5,365,575 | A | 11/1994 | Katz |
| 5,383,113 | A | 1/1995 | Kight et al. |
| 5,397,881 | A | 3/1995 | Mannik |
| 5,399,502 | A | 3/1995 | Friend et al. |
| 5,401,827 | A | 3/1995 | Holmes et al. |
| RE34,915 | E | 4/1995 | Nichtberger et al. |
| 5,424,524 | A | 6/1995 | Ruppert et al. |
| 5,450,477 | A | 9/1995 | Amarant et al. |
| 5,453,601 | A | 9/1995 | Rosen |
| 5,455,407 | A | 10/1995 | Rosen |
| 5,457,305 | A | 10/1995 | Akel et al. |
| 5,459,306 | A | 10/1995 | Stein et al. |
| 5,465,206 | A | 11/1995 | Hilt et al. |
| 5,466,919 | A | 11/1995 | Henry |
| 5,471,669 | A | 11/1995 | Lidman |
| 5,477,038 | A | 12/1995 | Levine et al. |
| 5,477,040 | A | 12/1995 | Lalonde |
| 5,479,494 | A | 12/1995 | Clitherow |
| 5,482,139 | A | 1/1996 | Rivalto |
| 5,483,444 | A | 1/1996 | Malark |
| 5,483,445 | A | 1/1996 | Pickering |
| 5,500,514 | A | 3/1996 | Veeneman et al. |
| 5,503,891 | A | 4/1996 | Marshall et al. |
| 5,511,114 | A | 4/1996 | Stimson et al. |
| 5,512,654 | A | 4/1996 | Holmes et al. |
| 5,513,102 | A | 4/1996 | Auriemma |
| 5,521,363 | A | 5/1996 | Tannenbaum |
| 5,530,232 | A | 6/1996 | Taylor |
| 5,530,235 | A | 6/1996 | Stefik et al. |
| 5,537,314 | A | 7/1996 | Kanter |
| 5,544,086 | A | 8/1996 | Davis et al. |
| 5,544,246 | A | 8/1996 | Mandelbaum et al. |
| 5,553,120 | A | 9/1996 | Katz |
| 5,577,109 | A | 11/1996 | Stimson et al. |
| 5,578,808 | A | 11/1996 | Taylor |
| 5,581,064 | A | 12/1996 | Riley et al. |
| 5,585,787 | A | 12/1996 | Wallerstein |
| 5,590,038 | A | 12/1996 | Pitroda |
| 5,592,560 | A | 1/1997 | Deaton et al. |
| 5,604,542 | A | 2/1997 | Dedrick |
| 5,608,785 | A | 3/1997 | Kasday |
| 5,612,868 | A | 3/1997 | Off |
| 5,619,558 | A | 4/1997 | Jheeta |
| 5,621,787 | A | 4/1997 | McKoy et al. |
| 5,621,812 | A | 4/1997 | Deaton et al. |
| 5,637,845 | A | 6/1997 | Kolls |
| 5,638,457 | A | 6/1997 | Deaton et al. |
| 5,642,279 | A | 6/1997 | Bloomberg et al. |
| 5,642,485 | A | 6/1997 | Deaton et al. |
| 5,644,723 | A | 7/1997 | Deaton et al. |
| 5,644,727 | A | 7/1997 | Atkins |
| 5,649,114 | A | 7/1997 | Deaton et al. |
| 5,649,117 | A | 7/1997 | Landry |
| 5,649,118 | A | 7/1997 | Carlisle et al. |
| 5,653,914 | A | 8/1997 | Holmes et al. |
| 5,659,741 | A | 8/1997 | Eberhardt |
| 5,664,110 | A | 9/1997 | Green et al. |
| 5,664,157 | A | 9/1997 | Takahira et al. |
| 5,665,953 | A | 9/1997 | Mazzamuto |
| 5,672,678 | A | 9/1997 | Holmes et al. |
| 5,675,607 | A | 10/1997 | Alesio et al. |
| 5,675,662 | A | 10/1997 | Deaton et al. |
| 5,677,955 | A | 10/1997 | Doggett et al. |
| 5,684,291 | A | 11/1997 | Taskett |
| 5,687,322 | A | 11/1997 | Deaton et al. |
| 5,689,100 | A | 11/1997 | Carrithers et al. |
| 5,689,650 | A | 11/1997 | McClelland et al. |
| 5,692,132 | A | 11/1997 | Hogan |
| 5,696,907 | A | 12/1997 | Tom |
| 5,699,528 | A | 12/1997 | Hogan |
| 5,703,344 | A | 12/1997 | Bezy et al. |
| 5,704,046 | A | 12/1997 | Hogan |
| 5,705,798 | A | 1/1998 | Tarbox |
| 5,708,422 | A | 1/1998 | Blonder et al. |
| 5,710,458 | A | 1/1998 | Iwasaki |
| 5,710,886 | A | 1/1998 | Christensen et al. |
| 5,710,887 | A | 1/1998 | Chelliah et al. |
| 5,710,889 | A | 1/1998 | Clark et al. |
| 5,715,399 | A | 2/1998 | Bezos |
| 5,717,925 | A | 2/1998 | Harper et al. |
| 5,721,768 | A | 2/1998 | Stimson et al. |
| 5,721,781 | A | 2/1998 | Deo et al. |
| 5,726,884 | A | 3/1998 | Sturgeon et al. |
| 5,727,153 | A | 3/1998 | Powell |
| 5,728,998 | A | 3/1998 | Novis et al. |
| 5,729,693 | A | 3/1998 | Holda-Fleck |
| 5,734,154 | A | 3/1998 | Jachimowicz et al. |
| 5,734,838 | A | 3/1998 | Robinson et al. |
| 5,736,728 | A | 4/1998 | Matsubara |
| 5,737,421 | A | 4/1998 | Audebert |
| 5,740,549 | A | 4/1998 | Reilly et al. |
| 5,742,775 | A | 4/1998 | King |
| 5,745,049 | A | 4/1998 | Akiyama et al. |
| 5,745,706 | A | 4/1998 | Wolfberg et al. |

(56) References Cited

U.S. PATENT DOCUMENTS

| | | |
|---|---|---|
| 5,749,075 A | 5/1998 | Toader et al. |
| 5,760,381 A | 6/1998 | Stich et al. |
| 5,765,138 A | 6/1998 | Aycock et al. |
| 5,765,141 A | 6/1998 | Spector |
| 5,770,843 A | 6/1998 | Rose et al. |
| 5,770,849 A | 6/1998 | Novis et al. |
| 5,774,870 A | 6/1998 | Storey |
| 5,777,305 A | 7/1998 | Smith et al. |
| 5,777,306 A | 7/1998 | Masuda |
| 5,777,903 A | 7/1998 | Piosenka et al. |
| 5,778,067 A | 7/1998 | Jones et al. |
| 5,787,156 A | 7/1998 | Katz |
| 5,787,404 A | 7/1998 | Fernandez-Holmann |
| 5,789,733 A | 8/1998 | Jachimowicz et al. |
| 5,790,636 A | 8/1998 | Marshall |
| 5,794,207 A | 8/1998 | Walker |
| 5,798,950 A | 8/1998 | Fitzgerald |
| 5,799,087 A | 8/1998 | Rosen |
| 5,802,176 A | 9/1998 | Audebert |
| 5,805,719 A | 9/1998 | Pare et al. |
| 5,806,042 A | 9/1998 | Kelly et al. |
| 5,806,044 A | 9/1998 | Powell |
| 5,806,045 A | 9/1998 | Biorge |
| 5,807,627 A | 9/1998 | Friend et al. |
| 5,809,478 A | 9/1998 | Greco |
| 5,814,796 A | 9/1998 | Benson et al. |
| 5,815,657 A | 9/1998 | Williams et al. |
| 5,815,658 A | 9/1998 | Kuriyama |
| 5,819,234 A | 10/1998 | Slavin et al. |
| 5,819,237 A | 10/1998 | Garman |
| 5,826,243 A | 10/1998 | Musmanno et al. |
| 5,832,457 A | 11/1998 | O'Brien |
| 5,832,488 A | 11/1998 | Eberhardt |
| 5,835,061 A | 11/1998 | Stewart |
| 5,835,576 A | 11/1998 | Katz |
| 5,839,113 A | 11/1998 | Federau et al. |
| 5,845,259 A | 12/1998 | West et al. |
| 5,845,260 A | 12/1998 | Nakano et al. |
| 5,852,811 A | 12/1998 | Atkins |
| 5,852,812 A | 12/1998 | Reeder |
| 5,857,079 A | 1/1999 | Claus et al. |
| 5,857,175 A | 1/1999 | Day et al. |
| 5,857,709 A | 1/1999 | Chock |
| 5,859,419 A | 1/1999 | Wynn |
| 5,864,609 A | 1/1999 | Cross et al. |
| 5,864,828 A | 1/1999 | Atkins |
| 5,864,830 A | 1/1999 | Armetta et al. |
| RE36,116 E | 2/1999 | McCarthy |
| 5,870,718 A | 2/1999 | Spector |
| 5,870,721 A | 2/1999 | Norris |
| 5,875,437 A | 2/1999 | Atkins |
| 5,883,377 A | 3/1999 | Chapin, Jr. |
| 5,883,810 A | 3/1999 | Franklin et al. |
| 5,884,271 A | 3/1999 | Pitroda |
| 5,884,278 A | 3/1999 | Powell |
| 5,884,285 A | 3/1999 | Atkins |
| 5,887,065 A | 3/1999 | Audebert |
| 5,890,138 A | 3/1999 | Godin et al. |
| 5,890,140 A | 3/1999 | Clark et al. |
| H1794 H | 4/1999 | Claus |
| 5,897,620 A | 4/1999 | Walker et al. |
| 5,897,621 A | 4/1999 | Boesch et al. |
| 5,905,246 A | 5/1999 | Fajkowski |
| 5,907,350 A | 5/1999 | Nemirofsky |
| 5,911,135 A | 6/1999 | Atkins |
| 5,911,136 A | 6/1999 | Atkins |
| 5,914,472 A | 6/1999 | Foladare et al. |
| 5,920,629 A | 7/1999 | Rosen |
| 5,920,844 A | 7/1999 | Hotta et al. |
| 5,920,847 A | 7/1999 | Kolling et al. |
| 5,923,734 A | 7/1999 | Taskett |
| 5,926,800 A | 7/1999 | Baronowski et al. |
| 5,930,217 A | 7/1999 | Kayanuma |
| 5,931,764 A | 8/1999 | Freeman et al. |
| 5,933,817 A | 8/1999 | Hucal |
| 5,937,068 A | 8/1999 | Audebert |
| 5,940,811 A | 8/1999 | Norris |
| 5,946,669 A | 8/1999 | Polk |
| 5,952,641 A | 9/1999 | Korshun |
| 5,953,423 A | 9/1999 | Rosen |
| 5,953,710 A | 9/1999 | Fleming |
| 5,955,961 A | 9/1999 | Wallerstein |
| 5,956,695 A | 9/1999 | Carrithers et al. |
| 5,963,648 A | 10/1999 | Rosen |
| 5,970,479 A | 10/1999 | Shepherd |
| 5,970,480 A | 10/1999 | Kalina |
| 5,974,399 A | 10/1999 | Giuliani et al. |
| RE36,365 E | 11/1999 | Levine et al. |
| 5,984,180 A | 11/1999 | Albrecht |
| 5,984,191 A | 11/1999 | Chapin, Jr. |
| 5,987,434 A | 11/1999 | Libman |
| 5,988,509 A | 11/1999 | Taskett |
| 5,991,413 A | 11/1999 | Arditti et al. |
| 5,991,743 A | 11/1999 | Irving et al. |
| 5,991,748 A | 11/1999 | Taskett |
| 5,991,750 A | 11/1999 | Watson |
| 5,999,596 A | 12/1999 | Walker et al. |
| 6,000,608 A | 12/1999 | Dorf |
| 6,000,832 A | 12/1999 | Franklin et al. |
| 6,002,383 A | 12/1999 | Shimada |
| 6,003,762 A | 12/1999 | Hayashida |
| 6,004,681 A | 12/1999 | Epstein et al. |
| 6,006,988 A | 12/1999 | Behrmann et al. |
| 6,009,415 A | 12/1999 | Shurling et al. |
| 6,014,636 A | 1/2000 | Reeder |
| 6,014,638 A | 1/2000 | Burge et al. |
| 6,014,645 A | 1/2000 | Cunningham |
| 6,014,749 A | 1/2000 | Gloor et al. |
| 6,016,482 A | 1/2000 | Molinari et al. |
| 6,016,954 A | 1/2000 | Abe et al. |
| 6,019,284 A | 2/2000 | Freeman et al. |
| 6,021,189 A | 2/2000 | Vu |
| 6,026,370 A | 2/2000 | Jermyn |
| 6,029,139 A | 2/2000 | Cunningham et al. |
| 6,029,144 A | 2/2000 | Barrett et al. |
| 6,029,890 A | 2/2000 | Austin |
| 6,032,136 A | 2/2000 | Brake, Jr. et al. |
| 6,032,859 A | 3/2000 | Muehlberger et al. |
| 6,036,099 A | 3/2000 | Leighton |
| 6,038,292 A | 3/2000 | Thomas |
| 6,038,552 A | 3/2000 | Fleischl et al. |
| 6,041,315 A | 3/2000 | Pollin |
| 6,044,360 A | 3/2000 | Picciallo |
| 6,045,042 A | 4/2000 | Ohno |
| 6,047,067 A | 4/2000 | Rosen |
| 6,047,268 A | 4/2000 | Bartoli et al. |
| 6,049,463 A | 4/2000 | O'Malley et al. |
| 6,049,773 A | 4/2000 | McCormack et al. |
| 6,049,782 A | 4/2000 | Gottesman et al. |
| 6,058,378 A | 5/2000 | Clark et al. |
| 6,064,985 A | 5/2000 | Anderson |
| 6,065,675 A | 5/2000 | Teicher |
| 6,068,183 A | 5/2000 | Freeman et al. |
| 6,070,067 A | 5/2000 | Nguyen et al. |
| 6,070,147 A | 5/2000 | Harms et al. |
| 6,070,153 A | 5/2000 | Simpson |
| 6,076,068 A | 6/2000 | DeLapa et al. |
| 6,076,072 A | 6/2000 | Libman |
| 6,078,888 A | 6/2000 | Johnson, Jr. |
| 6,078,891 A | 6/2000 | Riordan et al. |
| 6,091,817 A | 7/2000 | Bertina et al. |
| 6,092,056 A | 7/2000 | Tull, Jr. et al. |
| 6,095,412 A | 8/2000 | Bertina et al. |
| 6,095,416 A | 8/2000 | Grant et al. |
| 6,098,053 A | 8/2000 | Slater |
| 6,105,011 A | 8/2000 | Morrison, Jr. |
| 6,105,865 A | 8/2000 | Hardesty |
| 6,109,525 A | 8/2000 | Blomqvist et al. |
| 6,112,191 A | 8/2000 | Burke |
| 6,115,458 A | 9/2000 | Taskett |
| 6,119,097 A | 9/2000 | Ibarra |
| 6,119,103 A | 9/2000 | Basch et al. |
| 6,119,107 A | 9/2000 | Polk |
| 6,119,932 A | 9/2000 | Maloney et al. |

(56) References Cited

U.S. PATENT DOCUMENTS

| | | |
|---|---|---|
| 6,122,623 A | 9/2000 | Garman |
| 6,128,598 A | 10/2000 | Walker et al. |
| 6,128,599 A | 10/2000 | Walker et al. |
| 6,129,274 A | 10/2000 | Suzuki |
| 6,129,572 A | 10/2000 | Feldman et al. |
| 6,134,309 A | 10/2000 | Carson |
| 6,134,536 A | 10/2000 | Shepherd |
| 6,138,917 A | 10/2000 | Chapin, Jr. |
| 6,145,741 A | 11/2000 | Wisdom et al. |
| 6,148,297 A | 11/2000 | Swor et al. |
| 6,161,096 A | 12/2000 | Bell |
| 6,163,770 A | 12/2000 | Gamble et al. |
| 6,164,533 A | 12/2000 | Barton |
| 6,167,385 A | 12/2000 | Hartley-Urquhart |
| 6,169,975 B1 | 1/2001 | White et al. |
| 6,173,267 B1 | 1/2001 | Cairns |
| 6,182,048 B1 | 1/2001 | Osborn et al. |
| 6,182,894 B1 | 2/2001 | Hackett et al. |
| 6,186,793 B1 | 2/2001 | Brubaker |
| 6,189,787 B1 | 2/2001 | Dorf |
| 6,192,113 B1 | 2/2001 | Lorsch |
| 6,195,644 B1 | 2/2001 | Bowie |
| 6,202,053 B1 | 3/2001 | Christiansen et al. |
| RE37,122 E | 4/2001 | Levine et al. |
| 6,213,392 B1 | 4/2001 | Zuppicich |
| 6,223,143 B1 | 4/2001 | Weinstock et al. |
| 6,227,447 B1 | 5/2001 | Campisano |
| 6,243,688 B1 | 6/2001 | Kalina |
| 6,260,758 B1 | 7/2001 | Blumberg |
| 6,263,316 B1 | 7/2001 | Khan et al. |
| 6,265,977 B1 | 7/2001 | Vega et al. |
| 6,278,981 B1 | 8/2001 | Dembo et al. |
| 6,295,344 B1 | 9/2001 | Marshall |
| 6,295,522 B1 | 9/2001 | Boesch |
| 6,298,336 B1 | 10/2001 | Davis et al. |
| 6,308,268 B1 | 10/2001 | Audebert |
| 6,324,524 B1 | 11/2001 | Lent et al. |
| 6,330,546 B1 | 12/2001 | Gopinathan et al. |
| 6,336,099 B1 | 1/2002 | Barnett et al. |
| 6,338,048 B1 | 1/2002 | Mori |
| 6,341,724 B2 | 1/2002 | Campisano |
| 6,343,743 B1 | 2/2002 | Lamla |
| 6,345,261 B1 | 2/2002 | Feidelson et al. |
| 6,345,766 B1 | 2/2002 | Taskett et al. |
| 6,349,291 B1 | 2/2002 | Varma |
| 6,360,954 B1 | 3/2002 | Barnardo |
| 6,366,220 B1 | 4/2002 | Elliott |
| 6,373,969 B1 | 4/2002 | Adler |
| 6,374,230 B1 | 4/2002 | Walker et al. |
| 6,377,669 B1 | 4/2002 | Walker et al. |
| 6,385,591 B1 | 5/2002 | Mankoff |
| 6,385,594 B1 | 5/2002 | Lebda et al. |
| 6,386,444 B1 | 5/2002 | Sullivan |
| 6,397,202 B1 | 5/2002 | Higgins et al. |
| 6,402,039 B1 | 6/2002 | Freeman et al. |
| 6,405,182 B1 | 6/2002 | Cuervo |
| 6,422,459 B1 | 7/2002 | Kawan |
| 6,422,462 B1 | 7/2002 | Cohen |
| 6,424,029 B1 | 7/2002 | Giesler |
| 6,429,927 B1 | 8/2002 | Borza |
| 6,434,259 B1 | 8/2002 | Hamid et al. |
| D462,477 S | 9/2002 | Osborne |
| 6,446,210 B1 | 9/2002 | Borza |
| 6,450,407 B1 | 9/2002 | Freeman et al. |
| 6,463,039 B1 | 10/2002 | Ricci et al. |
| 6,467,684 B2 | 10/2002 | Fite et al. |
| 6,473,500 B1 | 10/2002 | Risafi et al. |
| 6,481,125 B1 | 11/2002 | Pokrasoff |
| 6,484,144 B2 | 11/2002 | Martin et al. |
| 6,484,148 B1 | 11/2002 | Boyd |
| 6,484,428 B1 | 11/2002 | Greenwald et al. |
| D466,929 S | 12/2002 | Haas |
| D467,271 S | 12/2002 | Haas |
| D467,272 S | 12/2002 | Haas |
| 6,498,861 B1 | 12/2002 | Hamid et al. |
| D468,789 S | 1/2003 | Arnold et al. |
| 6,505,095 B1 | 1/2003 | Kolls |
| 6,505,168 B1 | 1/2003 | Rothman et al. |
| 6,505,780 B1 | 1/2003 | Yassin et al. |
| 6,529,880 B1 | 3/2003 | McKeen et al. |
| D474,235 S | 5/2003 | Haas |
| 6,557,750 B1 | 5/2003 | Druse et al. |
| 6,557,766 B1 | 5/2003 | Leighton |
| 6,560,578 B2 | 5/2003 | Eldering |
| 6,561,657 B1 | 5/2003 | Schofield |
| 6,567,786 B1 | 5/2003 | Bibelnieks et al. |
| 6,567,821 B1 | 5/2003 | Polk |
| 6,574,603 B1 | 6/2003 | Dickson et al. |
| 6,581,839 B1 | 6/2003 | Lasch et al. |
| D476,681 S | 7/2003 | Al Amri |
| D477,359 S | 7/2003 | Haas |
| 6,601,040 B1 | 7/2003 | Kolls |
| 6,601,761 B1 | 8/2003 | Katis |
| 6,609,111 B1 | 8/2003 | Bell |
| RE38,255 E | 9/2003 | Levine et al. |
| 6,615,189 B1 | 9/2003 | Phillips et al. |
| 6,615,190 B1 | 9/2003 | Slater |
| 6,625,582 B2 | 9/2003 | Richman et al. |
| 6,631,849 B2 | 10/2003 | Blossom |
| 6,641,049 B2 | 11/2003 | Luu |
| 6,641,050 B2 | 11/2003 | Kelley et al. |
| 6,671,673 B1 | 12/2003 | Baseman et al. |
| D485,573 S | 1/2004 | Li |
| 6,675,127 B2 | 1/2004 | LaBlanc et al. |
| 6,675,149 B1 | 1/2004 | Ruffin et al. |
| 6,687,222 B1 | 2/2004 | Albert et al. |
| 6,693,544 B1 | 2/2004 | Hebbecker |
| 6,732,919 B2 | 5/2004 | Macklin et al. |
| 6,742,704 B2 | 6/2004 | Fitzmaurice et al. |
| 6,745,938 B2 | 6/2004 | Sullivan |
| 6,757,660 B2 | 6/2004 | Canada et al. |
| 6,757,710 B2 | 6/2004 | Reed |
| D495,736 S | 9/2004 | Scharf |
| 6,793,135 B1 | 9/2004 | Ryoo |
| 6,802,008 B1 | 10/2004 | Ikefuji et al. |
| 6,805,287 B2 | 10/2004 | Bishop |
| 6,856,973 B1 | 2/2005 | Bott |
| 6,865,547 B1 | 3/2005 | Brake, Jr. et al. |
| 6,868,426 B1 | 3/2005 | Mankoff |
| 6,876,971 B1 | 4/2005 | Burke |
| D505,450 S | 5/2005 | Lauer et al. |
| 6,895,383 B2 | 5/2005 | Heinrich |
| 6,895,386 B1 | 5/2005 | Bachman et al. |
| 6,901,372 B1 | 5/2005 | Helzerman |
| 6,912,502 B1 | 6/2005 | Buddle et al. |
| 6,970,830 B1 | 11/2005 | Samra et al. |
| 6,978,369 B2 | 12/2005 | Wheeler et al. |
| 6,999,943 B1 | 2/2006 | Johnson et al. |
| 7,006,992 B1 | 2/2006 | Packwood |
| 7,051,925 B2 | 5/2006 | Schwarz, Jr. |
| 7,072,864 B2 | 7/2006 | Brake, Jr. et al. |
| 7,072,909 B2 | 7/2006 | Polk |
| 7,089,503 B1 | 8/2006 | Bloomquist et al. |
| 7,092,905 B2 | 8/2006 | Behrenbrinker et al. |
| 7,092,916 B2 | 8/2006 | Diveley |
| 7,104,443 B1 | 9/2006 | Paul et al. |
| 7,107,249 B2 | 9/2006 | Dively |
| 7,113,914 B1 | 9/2006 | Spielmann et al. |
| D533,220 S | 12/2006 | Graves et al. |
| 7,165,049 B2 | 1/2007 | Slater |
| D538,349 S | 3/2007 | Hollands |
| 7,216,091 B1 | 5/2007 | Blandina et al. |
| 7,225,155 B1 | 5/2007 | Polk |
| 7,243,839 B2 | 7/2007 | Beck et al. |
| 7,249,092 B2 | 7/2007 | Dunn et al. |
| 7,252,223 B2 | 8/2007 | Schofield |
| D551,705 S | 9/2007 | Mershon |
| 7,295,999 B1 | 11/2007 | Simon et al. |
| 7,315,843 B2 | 1/2008 | Diveley et al. |
| 7,346,567 B2 | 3/2008 | Weeks |
| 7,392,222 B1 | 6/2008 | Hamilton et al. |
| 7,392,224 B1 | 6/2008 | Bauer et al. |
| 2001/0011227 A1 | 8/2001 | Ashery et al. |
| 2001/0011243 A1 | 8/2001 | Dembo et al. |

(56) References Cited

U.S. PATENT DOCUMENTS

| | | |
|---|---|---|
| 2001/0027389 A1 | 10/2001 | Beverina et al. |
| 2001/0027441 A1 | 10/2001 | Wankmueller |
| 2001/0034647 A1 | 10/2001 | Marks et al. |
| 2001/0034682 A1 | 10/2001 | Knight et al. |
| 2001/0037315 A1 | 11/2001 | Saliba et al. |
| 2001/0044293 A1 | 11/2001 | Morgan |
| 2001/0047332 A1 | 11/2001 | Gonen-Friedman et al. |
| 2001/0047342 A1 | 11/2001 | Cuervo |
| 2001/0054003 A1 | 12/2001 | Chien et al. |
| 2001/0056398 A1 | 12/2001 | Scheirer |
| 2002/0019793 A1 | 2/2002 | Frattalone |
| 2002/0019803 A1 | 2/2002 | Muller |
| 2002/0026418 A1 | 2/2002 | Koppel et al. |
| 2002/0046089 A1 | 4/2002 | Zorn |
| 2002/0046255 A1 | 4/2002 | Moore et al. |
| 2002/0062235 A1 | 5/2002 | Wahlbin et al. |
| 2002/0065720 A1 | 5/2002 | Carswell et al. |
| 2002/0077964 A1 | 6/2002 | Brody et al. |
| 2002/0077978 A1 | 6/2002 | O'Leary et al. |
| 2002/0082990 A1 | 6/2002 | Jones |
| 2002/0091572 A1 | 7/2002 | Anderson et al. |
| 2002/0091631 A1 | 7/2002 | Usui |
| 2002/0095365 A1 | 7/2002 | Slavin et al. |
| 2002/0099586 A1 | 7/2002 | Bladen et al. |
| 2002/0104878 A1 | 8/2002 | Seifert et al. |
| 2002/0111916 A1 | 8/2002 | Coronna et al. |
| 2002/0116271 A1 | 8/2002 | Mankoff |
| 2002/0116330 A1 | 8/2002 | Hed et al. |
| 2002/0120627 A1 | 8/2002 | Mankoff |
| 2002/0120642 A1 | 8/2002 | Fetherston |
| 2002/0129221 A1 | 9/2002 | Borgia et al. |
| 2002/0138418 A1 | 9/2002 | Zarin et al. |
| 2002/0143703 A1 | 10/2002 | Razvan et al. |
| 2002/0147662 A1 | 10/2002 | Anderson |
| 2002/0156723 A1 | 10/2002 | Lilly et al. |
| 2002/0165771 A1 | 11/2002 | Walker et al. |
| 2002/0165820 A1 | 11/2002 | Anvekar et al. |
| 2002/0169719 A1 | 11/2002 | Dively et al. |
| 2002/0174016 A1 | 11/2002 | Cuervo |
| 2002/0174018 A1 | 11/2002 | Bunger et al. |
| 2002/0178025 A1 | 11/2002 | Hansen et al. |
| 2002/0194081 A1 | 12/2002 | Perkowski |
| 2003/0004828 A1 | 1/2003 | Epstein |
| 2003/0018613 A1 | 1/2003 | Oytac |
| 2003/0023549 A1 | 1/2003 | Armes et al. |
| 2003/0028518 A1 | 2/2003 | Mankoff |
| 2003/0033211 A1 | 2/2003 | Haines et al. |
| 2003/0033246 A1 | 2/2003 | Slater |
| 2003/0046249 A1 | 3/2003 | Wu |
| 2003/0053609 A1 | 3/2003 | Risafi et al. |
| 2003/0074290 A1 | 4/2003 | Clore |
| 2003/0101119 A1 | 5/2003 | Parsons et al. |
| 2003/0105672 A1 | 6/2003 | Epstein et al. |
| 2003/0110111 A1 | 6/2003 | Nalebuff et al. |
| 2003/0135462 A1 | 7/2003 | Brake, Jr. et al. |
| 2003/0140004 A1 | 7/2003 | O'Leary et al. |
| 2003/0144935 A1 | 7/2003 | Sobek |
| 2003/0154125 A1 | 8/2003 | Mittal et al. |
| 2003/0163403 A1 | 8/2003 | Chen et al. |
| 2003/0163416 A1 | 8/2003 | Kitajima |
| 2003/0172040 A1 | 9/2003 | Kemper et al. |
| 2003/0195808 A1 | 10/2003 | Brown et al. |
| 2003/0200143 A9 | 10/2003 | Walker et al. |
| 2003/0200180 A1 | 10/2003 | Phelan et al. |
| 2003/0204421 A1 | 10/2003 | Houle et al. |
| 2003/0216965 A1 | 11/2003 | Libman |
| 2003/0229525 A1 | 12/2003 | Callahan et al. |
| 2004/0024672 A1 | 2/2004 | Brake, Jr. et al. |
| 2004/0030626 A1 | 2/2004 | Libman |
| 2004/0039588 A1 | 2/2004 | Libman |
| 2004/0059952 A1 | 3/2004 | Newport et al. |
| 2004/0064402 A1 | 4/2004 | Dreyer et al. |
| 2004/0093296 A1 | 5/2004 | Phelan et al. |
| 2004/0093303 A1 | 5/2004 | Picciallo |
| 2004/0098351 A1 | 5/2004 | Duke |
| 2004/0103431 A1 | 5/2004 | Davenport et al. |
| 2004/0118914 A1 | 6/2004 | Smith et al. |
| 2004/0128186 A1 | 7/2004 | Breslin et al. |
| 2004/0193539 A1 | 9/2004 | Sullivan |
| 2004/0215507 A1 | 10/2004 | Levitt et al. |
| 2004/0243498 A1 | 12/2004 | Duke |
| 2005/0021353 A1 | 1/2005 | Aviles et al. |
| 2005/0021400 A1 | 1/2005 | Postrel |
| 2005/0021457 A1 | 1/2005 | Johnson et al. |
| 2005/0027649 A1 | 2/2005 | Cech |
| 2005/0035192 A1 | 2/2005 | Bonalle et al. |
| 2005/0071230 A1 | 3/2005 | Mankoff |
| 2005/0075932 A1 | 4/2005 | Mankoff |
| 2005/0077350 A1 | 4/2005 | Courtion et al. |
| 2005/0091138 A1 | 4/2005 | Awatsu |
| 2005/0102228 A1 | 5/2005 | Srinivasan et al. |
| 2005/0108152 A1 | 5/2005 | Tsoa-Lee et al. |
| 2005/0119979 A1 | 6/2005 | Murashita et al. |
| 2005/0171898 A1 | 8/2005 | Bishop et al. |
| 2005/0199705 A1 | 9/2005 | Beck et al. |
| 2005/0234771 A1 | 10/2005 | Register et al. |
| 2005/0269396 A1 | 12/2005 | Schofield |
| 2006/0026092 A1 | 2/2006 | Klein et al. |
| 2006/0036553 A1 | 2/2006 | Gupta et al. |
| 2006/0047573 A1 | 3/2006 | Mitchell et al. |
| 2006/0047589 A1 | 3/2006 | Grau |
| 2006/0074794 A1 | 4/2006 | Nespola |
| 2006/0085334 A1 | 4/2006 | Murphy |
| 2006/0106696 A1 | 5/2006 | Carlson |
| 2006/0116903 A1 | 6/2006 | Becerra |
| 2006/0122918 A1 | 6/2006 | Graboske et al. |
| 2006/0131869 A1 | 6/2006 | Brignull |
| 2006/0224480 A1 | 10/2006 | Bent et al. |
| 2006/0242057 A1 | 10/2006 | Velarde |
| 2006/0251478 A1 | 11/2006 | Desmeules |
| 2008/0177659 A1 | 7/2008 | Lacey et al. |

FOREIGN PATENT DOCUMENTS

| | | |
|---|---|---|
| EP | 0855659 | 7/1998 |
| EP | 959440 | 11/1999 |
| GB | 2275654 A | 9/1994 |
| GB | 2376787 | 12/2002 |
| GB | 2377071 | 12/2002 |
| GB | 2377314 | 1/2003 |
| WO | WO 94/29112 | 12/1994 |
| WO | WO 97/41673 | 11/1997 |
| WO | WO 98/59307 | 12/1998 |
| WO | WO 99/05633 | 2/1999 |
| WO | WO 99-54841 | 10/1999 |
| WO | WO 01/18699 | 3/2001 |
| WO | WO 01/69347 | 9/2001 |
| WO | WO 01/69347 A2 | 9/2001 |
| WO | WO 01/69347 A3 | 9/2001 |
| WO | WO 2005/043277 A3 | 5/2005 |

OTHER PUBLICATIONS

Song, A Card That Asks for ID, Time Magazine, Apr. 12, 2004, 1 page.

A Store Card Issuer Looks for Lift from Electronic Gift Certificates, Credit Card News, Feb. 1, 1995, 2 pages.

Claessens, et al., A Tangled World Wide Web of Security Issues, First Monday, retrieved from the internet at http://www.firstmonday.org/issues/issue7_3/claessens, retrieved from the internet on Oct. 6, 2006.

Hotchkiss, ATM's at the head of their class, Bank Marketing, vol. 29, No. 3, Mar. 1997, pp. 26-32.

Edwards, ATMs The Hot New Media Buy, ABA Banking Journal, Mar. 1999, pp. 58, 60.

American Express Incentive Services, Incentive, Sep. 1996, p. 126.

Fickenscher, Amex Prepaid Offering is Latest Card for Firms Regarding Employees, American Banker, vol. 161, No. 151, Aug. 8, 1996, pp. 1-2.

Neumann, An Enhanced Neural Network Technique for Software Risk Analysis, IEEE Transactions on Software Engineering, vol. 28, No. 9, Sep. 1, 2002, pp. 904-912.

(56) References Cited

OTHER PUBLICATIONS

Associates First Capital Corporation, Hoover's Inc., The Industry Standard: The Newsmagazine of the Internet Economy, thestandard.net/companies/company-display, Apr. 6, 1999.
Brehl, Banks issue cash-card pledge, The Toronto Star, Oct. 9, 1997, 1 page.
Blockbuster running test of a stored value card, The American Banker, Sep. 1, 1995.
Meece, Boatman's Prepaid Cards for Worker-Incentive Firm, American Banker, Jul. 2, 1996, p. 12.
Boatmen's Floats Stored Value into the Employee Incentive Waters, Debit Card News, vol. 2, Issue 2, Jul. 16, 1996, 3 pages.
CES/NaBanco introduces stored value card technology blockbuster video is first merchant partner, Business Wire, Inc., Jan. 15, 1996.
CardEx Incentives, www.cardex.com, Apr. 6, 1999.
CardFlash, Apr. 5, 2005.
Vandenengel, Cards on the Internet: Advertising on a $3 Bill, Industry Intelligence, Feb. 1, 1995, pp. 46-48.
Kutler, Cash Card Creator Looking Beyond Mondex, Feb. 9, 1995.
Rosen, Cash Just Isn't Flexible Enough: Shops of the Future Will Only Take Cards, Daily Express, Technology Section, Feb. 10, 1995, 1 page.
Bank, Cash, Check,Charge—What's Next?, Seattle Times, Mar. 6, 1995.
Morgan et al., Categorizing Risks for Risk Ranking, vol. 20, No. 1, Jun. 22, 2005, pp. 49-58.
Common electronic purse specifications, Business Requirements, Version 6.0, Dec. 1998.
Guidotti, Comparing Environmental risks: A Consultative Approach to Setting Priorities at the Community Level, Public Health Rev 1994, vol. 22, Jun. 16, 2005, pp. 321-337.
Britt, Competing in Auto Lending, America's Community Banker, vol. 5, No. 11, Nov. 1, 1996, pp. 33-37.
Consortium created to manage common electronic purse specification, Cardtech Securtech, Chicago, www.visa.com/av/news/PRmisc051199.vhtml, May 11, 1999.
Hight, Jim, Consulting Services, www.strategies-tactics.com.
Nora Wood, Corporate Spotlight, Incentive, Dec. 1997, 4 pages.
Mobasher et al., Creating Adaptive Web Sites Through Usage-Based Clustering of URLs, Knowledge and Data Engineering Exchange Workshop, Chicago, IL and Los Alamitos, CA, 1999, pp. 19-25.
Lamond, Credit Card Transactions Real World and Online, Paying by Credit Card-Real World and Online, http://www.virtualschool.edu/mon/ElectronicProperty/klamond/credit, printed Jul. 8, 2005, 17 pages.
D.C. Area Safeway Stores Look for Increase in Sales Volume and Revenue with Cards, Card News, vol. 6, No. 25, Dec. 30, 1991, pp. 7-9.
Piskora, Debit Cards Seen Poised for New Markets, American Banker, Credit/Debit/ATMs, Mar. 7, 1995, p. 16.
Definition of Store-Value Card, Wikipedia, retrieved from the internet at http://en.wikipedia.org/wiki/Stored-value_card, retrieved from the internet on Apr. 16, 2007.
E-Z Pass, Web page, http://www.ezpass.com-Disc_portNewYork.html, Nov. 12, 2001.
E-Z Pass, Web page, http:\\www.ezpass.com-Disc_ny_annual.html, Nov. 12, 2001.
E-Z Pass, Web page, http:\\www.ezpass.com-frameMain.html, Nov. 12, 2001.
E-Z Pass, Web page, http:\\www.ezpass.com-whatis.html, Nov. 12, 2001.
Eight Keys to Making the Right Choice, Incentive, Dec. 1996, 9 pages.
D. O'Mahony, Electronic Payment System, 1997, Artech House, XP002137255, p. 7-11.
Business Times, Electronic Purse Can Free You from ATM Drag, Business Times, www.btimes.co.za, printed Feb. 23, 2001, 1 page.
Electronic Purse, SCIA (Smart Card Industry Association), About Smart Cards, www.scia.org, printed Feb. 23, 2001, 1 page.

Sanchez-Klein, Electronic purse alliance planned, Computerworld Online News, Jul. 29, 1998, printed Feb. 23, 2001, 2 pages.
Electronic purse card to be launched tomorrow, New Straits Times, News Clippings, Sep. 18, 1999, printed Feb. 23, 2001, 3 pages.
Exclusively Yours From Maritz . . . The MasterCard Card Ultimate Incentive, Incentive, Oct. 1995, 3 pages.
Block, First Data Subsidiary Creates Payroll Card for the Bankless, LexisNexis Academic, Credit/Debit/ATMs, p. 10, Mar. 21, 1997.
First Data markets stored-value cards, Cards International, Jan. 30, 1996, p. 5.
First USA Platinum Connect, First USA Bank, First USA Promotional Mailing, Oct. 1997, 6 pages.
First Union Issues Smart Cards to Fort Benning Recruits, CardFax, vol. 1999, No. 60, Mar. 26, 1999, 1 page.
Norris, First data unit develops blockbuster cash card, Omaha World Hearld Sunrise Edition, Business Section, Jan. 19, 1996, p. 16.
Frequently asked questions, ECARD, www.eregard.com, printed Sep. 23, 2001, 7 pages.
Machlis, Have it the smart way: Burger King program drives smart-card use, Computerworld, printed Feb. 23, 2001, 1 page.
Here's the calling convenience you asked for: 1-800-call-ATT . . . For All Calls, AT&T, Appendix A: For Card Carriers, 1999, 7 pages.
Hoovers, General Mills, Inc. Corporate Profile relied upon to show the history of the company, http:/cobrands.hoovers.com/global/cobrands/proquest/history.xhtml?COID=10639, Jul. 12, 2005, 2 pages.
Konrad, IBM Had a Bunch of Unusual Ideas in 2003, www.philly.com, printed Jan. 21, 2004, posted on Jan. 13, 2004, 2 pages.
Judy Quinn, Incentive Cards Explained, Incentive, Dec. 1995, 5 pages.
Vincent Alonzo, Incentive Marketing . . . Three If by Smart Card, Incentive Sep. 1995, p. 11.
Incentive gift Card: Another way to give the gift of choice!, Incentive, Aug. 1995, 2 pages.
Coulton, Incentives Field Moving to Card-Based Series 14, American Banker, Mar. 26, 1998, 3 pages.
Introducing SpendingMoney(TM), Armetta: Marketing & Design Product Concept Report, Oct. 9, 1996, 15 pages.
Introducing the First USA Platinum Connect Card, First USA Promotional Mailing, Dec. 1997, 2 pages.
Key Bank Holiday Offer, http://www.key.com/swiftgiftlhome.html, printed Apr. 5, 1999.
LexisNexis Academic, Debit Card Innovation, vol. XXXV, No. 5, p. 2, May 1997.
LexisNexis Academic, Debit Cards: Payroll Card Ups Fees, Future Banker, p. 18, Oct. 6, 1997.
LexisNexis Academic, NTS' TransPay Debit Card Helps Remote and Unbanked Employees Get Funds Quicker, Financial News, Mar. 18, 1997.
MailFrontier Survey Finds that Consumers Hold Financial Institutions Accountable for Online Identitiy Theft, www.mailfrontier.com, Palo Alto, CA, Nov. 2004.
O'Conner, Maritz Gets MasterCard's Stamp of Approval, Business Travel News, Aug. 19, 1996, 2 pages.
Maritz, Incentive, Jun. 1996, p. 111.
Clark, Microsoft, Visa to Jointly Develop PC Electronic-Shopping Software, The Wall Street Journal, Nov. 9, 1994, WSJ B9.
More Retailers Turn to Co-Branding, Chain Store Age Executive with Shopping Center Age, Feb. 1, 1995, 3 pages.
Bogle, Mutual Funds at the Millennium: Fund Directors and Fund Myths, The Vanguard Group to the '40 Act Institute of PLI (Practicing Law Institute), New York, NY, May 15, 2000, 15 pages.
New 1-800-CALL-ATT Campaign Promotes One Number for All Calls, AT&T Marketing, News Release, www.att.com/press/0297/970217.csa.htm, Feb. 17, 1997, 2 pages.
Allen et al., Overview of Smart Cards and the Industry, Smart Cards: Seizing Strategic Business Opportunities, Chapter 1, p. 2-20, Irwin Professional Publishing, 1997.
Paper or Plastic? With these three incentives, The Choice is Yours, Incentive, Feb. 1996, 2 pages.
Dugas, Payroll May Ask: Paper or Plastic?, USA Today, 3B, Aug. 14, 2001, 1 page.

(56) References Cited

OTHER PUBLICATIONS

Proton world and Europay to co-operate in creation of new CEPS-compliant e-purse application, Press Release 1999, Waterloo, Belgium, Jun. 28, 1999, 2 pages.
Brown et al., Purchasing Card Magic: Eli Lilly Finds Accounts Payable Flying High With Plastic, Corporate Cashflow, vol. 15, No. 12, Nov. 1994, 2 pages.
Purse Application for Cross Border Use in Euro, Cordis, Pace 1st 1999-11531 Pace, www.cordis.lu, printed Feb. 23, 2001, 3 pages.
SK100 Smart Card Electronic Purse Balance Reader, SK100 Balance Reader, http://perso.wanadoo.fr, printed Feb. 23, 2001, 1 page.
Miller, Section E.2.1: Kerberos Authentication and Authorization System, Project Athena, Cambridge, MA, Dec. 21, 1987, 39 pages.
Souccar, Smart Cards: 1st Union Smart Card Pilot Enlists a Second Army Base, American Banker, Digital Frontiers, vol. 164, No. 61, Mar. 31, 1999, 3 pages.
Smart Cards: Big Brother's Little Helpers, The Privacy Committee of New South Wales, No. 66, Aug. 1995.
Smart card for loyalty and e-purse applications eclipses capability of conventional mag-stripe cards, Press Release, www.1.sib.com, Apr. 21, 1997, printed Feb. 23, 2001, 3 pages.
SmartAxis: Load Cash on to your E-Purse Card, Supported Currencies and Schemes, www.smartaxis.co.uk, printed Feb. 23, 2001, 9 pages.
Spurgin, Sopininmon! or What's Happening in the Retail Credit Card Environment, Credit World Journal, vol. 85, No. 4, Mar. 1, 1997, pp. 20-23.
Lacker, Stored Value Cards: Costly Private Substitutions for Government Currency, Economic Quarterly, 1996, Economic Quarterly, v82, n3, p. 1(25), ISSN: 1069-7225, 17 pages.
Lazarony, Stuck for a gift? Give a prepaid credit card, www.bankrate.com, Dec. 21, 1998, 1 page.
Key, Swift Gift 'Wows' Internet Shoppers, PR Newswire, www.key.com/swiftgift/home.html, Dec. 2, 1998, 1 page.
The Campus Card Conundrum, Card Technology, Journal ISSN: 1093-1279, p. 25+, Feb. 1998, pp. 1-8.
The Electronic Purse Reaches the Car Park, http:\\docs.vircom.net/mobility/parking, printed Feb. 23, 2001, 2 pages.
The Evolution of a New Consumerism, Chain Store Age, vol. 73, Jun. 1997, pp. 8-9.
Stoughton, The Gift of Credit, www.washingtonpost.com/wp-srv/business, Dec. 14, 1998.
Nora Wood, The Power of the Card, Incentive, Jul. 1997, 6 pages.
Stuber, The electronic purse: An overview of recent development and issues, Bank of Canada, Technical Report No. 74, www.bankofcanada.ca, Jan. 1996, printed Feb. 23, 2001, 2 pages.
Understanding the benefits: Smartcity offers a number Of important benefits to both the card issuers and their customers, http://www.icl.com/smartcards/benefits.htm, printed Feb. 27, 2001, 2 pages.
Langheinrich et al., Unintrusive Customization Techniques for Web Advertising, Computer Networks, vol. 31, 1999, pp. 1259-1272.
Universal Card free lifetime membership extended 3 months, AT&T Marketing, www.att.com/press/0297/970217.csa.html, Dec. 4, 1990, 2 pages.
Visa Cash—Where can I get it?, www.visa-asia.com/pd/cash/where.html, Feb. 23, 2001.
Visa Cash, www.visa-asia.com/pd/cash/main.html, Feb. 23, 2001.
Visa International and SERMEPA Announce Plans for Cross Border Visa Cash Based on CEPS, www.visa.com/av/news/praaamisc111699.vhtml, Nov. 16, 1999.
Visa first to launch electronic purse load via GSM mobile phone, www.cellular.co.za, Johannesburg, ZA, printed Feb. 23, 2001, 4 pages.
Visa releases visa cash electronic purse specifications based on CEPS, www.visa.com/av/news/PRaamisc042099.vhtml, San Francisco, Apr. 20, 1999.
Hansell, Visa to unveil electronic purse cards, New York Times, printed Feb. 23, 2001, 2 pages.
Welcome to Card Express CardEx, CardEx website archived by web.archive on Oct. 31, 1996, http://web.archive.org/web/*/http://www.cardex.com, retrieve Oct. 18, 2003, 7 pages.
Welcome to Card Express, The CardEx Incentive Card, as disclosed in the CardEx web site archived by web.archive.org on Feb. 7, 1998, http://web.archive.org/web/*/http://www.cardex.com, retrieve Oct. 18, 2003, 8 pages.
Swiftgift, Welcome to Swiftgift, www.swiftgiftcard.com, Dec. 8, 1998, 10 pages.
Kenneth Hein, What's the Deal?, Incentive, Jul. 1998, 7 pages.
Machlis et al., Will smart cards replace ATMS?, Computerworld, printed Feb. 23, 2001, 3 pages.

SYSTEM AND METHOD FOR GRANTING PROMOTIONAL REWARDS TO FINANCIAL ACCOUNT HOLDERS

RELATED APPLICATIONS

This application claims the benefit U.S. Provisional Application Ser. No. 60/948,127, filed Jul. 5, 2007, titled "System and Method for Granting Promotional Rewards to Financial Account Holders." The specification and drawings of the above application is incorporated herein by reference in their entirety.

This application is related to: (1) U.S. patent application Ser. No. 11/634,159, filed Dec. 6, 2006, titled "System and Method for Offering Reward Programs, which claims priority to U.S. Provisional Application No. 60/822,609, filed on Aug. 16, 2006, and titled "System and Method for Offering Reward Programs"; (2) co-pending U.S. patent application Ser. No. 10/284,394, filed Oct. 31, 2002, titled "System and Method for Establishing or Modifying and Account with User Selectable Terms," which claims priority to U.S. Provisional Application Ser. No. 60/330,871, filed Nov. 1, 2001, titled "System and Method for Establishing or Modifying an Account with User Selectable Terms"; and (3) U.S. Provisional Application No. 60/842,015, filed on Sep. 5, 2006, and titled "For Dynamically Identifying, Prioritizing And Offering Reward Categories."

FIELD OF THE INVENTION

The present invention relates to the dynamic identification and offering of rewards. More particularly, the present invention relates to systems and methods that enable issuers, sponsors, or account administrators, for example, to dynamically identify and offer its customers rewards.

BACKGROUND

Rewards programs are becoming increasingly popular. Card or account issuers and account administrators, such as banks, for example, commonly offer their customers reward cards (e.g., credit cards, debit cards, stored value cards, or gift cards) that aim to encourage or induce customer behavior by rewarding all or select transactions. Rewards are typically based on any number of transaction particulars, such as spending levels, types of transaction, identity of merchant or vendor, location of transactions, or any other data or information that demonstrates user behavior. For example, a bank may provide incentives (e.g., rebates or discounts) on purchases made through a particular vendor or merchant. Rewards may also include cash-back deals where the customer earns a percentage of the transaction amounts as cash value that gets added to the customer's account.

In some cases, reward cards may be "branded" with the name of a particular sponsor or merchant so that use of the card earns the customer points that may be redeemed through the sponsor or merchant. For example, a credit card sponsored by an airline may reward the user with airline miles that may be redeemed for free or discounted travel. Likewise, some cards earn store dollars that can be used as virtual cash to make purchases through select merchants and vendors.

Although conventional systems and methods enable banks and sponsors to provide customers with a wide variety of reward categories, they nonetheless suffer from several notable drawbacks. For example, current systems and methods do not enable sponsors and account administrators to randomly or selectively identify and offer customers rewards on an ongoing basis. More specifically, current systems and methods do not enable sponsors or account administrators, for example, to prioritize or organize its customers' transactions and thereafter randomly (or according to an algorithm(s) or other selection technique) select at least one customer or transaction which will receive or redeem a reward. For example, current systems and methods do not enable a bank to organize its customers' transactions by date and time and thereafter select at least one customer or transaction which will be paid for by the bank. In addition, existing systems and methods do not allow users to selectively identify transaction(s), at the point-of-sale, that the customer would like to apply rewards to.

Thus, what is needed is a reward system and method that enables an account administrator or sponsor, for example, to prioritize or organize its customers' transactions and thereafter randomly (or according to an algorithm(s) or other selection technique) select at least one customer or transaction which will receive or redeem a reward.

SUMMARY OF THE INVENTION

According to various embodiments, the systems and methods described herein may relate to systems and methods that prioritize or organize customers or account transactions, for example, according to a particular priority or ordering scheme and thereafter randomly (or according to an algorithm(s) or other selection technique) select at least one customer or transaction that will receive or redeem a reward. In some embodiments, the customer is not aware that a reward is being given until such time as the customer is notified that the reward has been made or is being offered by the sponsor or account administrator, such as a bank, for example. In some embodiments, the reward may be related to the particular transaction(s) selected, such as, for example, a reward that the bank or sponsor will pay for, cover or discount the expense associated with the transaction. In some embodiments, the reward may be presented to the winning customer or account in the form of a gift card or points, miles or any other currency or unit that may be issued as a redeemable reward, for example. Other rewards and types of rewards are possible. In some embodiments, the customer may be offered a choice of rewards or transactions to select from.

A bank or sponsor utilizing the systems and methods described herein may prioritize or order all customer transactions (e.g., by date or time; amount spent; merchant; product or good purchased; type of transaction; customer; account type; or any other parameter which may be used to prioritize or order transactions) and thereafter randomly or according to an algorithm(s) or other selection technique select which transaction(s) or customer(s) the bank or sponsor will reward. In some embodiments, prioritizing or ordering of transactions may occur randomly, according to a schedule, or periodically, such as, daily, weekly, monthly, or other periodic period of time. For example, every day, week or month, the sponsor or bank may prioritize or order all transactions that have been made during that period of time. In some embodiments, a customer may receive bonus entries for purchases made at specific merchants, merchant categories, amount spent or other parameter. In some embodiments, after transactions have been prioritized or ordered, the sponsor or bank may exclude certain customers or transactions for any particular reason, such as, for example, a particular customer or transaction is not located within a specific geographic area or location.

In some embodiments, determining which customer(s) or transaction(s) is/are to receive or redeem a reward may be based on any selection technique or method. For example, a customer or transaction may be selected based on the customer's demonstrated behavior (e.g., the most frequent shopper among the customer's in the prioritized or ordered list), the date or time of a transaction, the type of transaction conducted, the total amount spent by the customer in a given or group of transactions, the specific products or services (or types or categories of products or services) the customer purchased or routinely purchases, the merchants or other entities through which purchases or other transactions are entered into, the types of rewards the customer has historically preferred or actually redeemed in the past, or any other data or information that may be used to particularly identify and select customer(s) or transaction(s) for the purposes set forth herein.

Once at least one customer or transaction is selected, the systems and methods described herein may notify the customer that a reward has been or will be applied to the selected transaction, or that a reward is available for selection by the customer. Notification may be made in any manner, such as by electronic mail or other electronic messaging, telephone, mail, or other appropriate manner. In some embodiments, a customer may be notified on the electronic or hardcopy statement of account, such that the winning transaction, for example, may include a designation that a reward has been received in connection therewith. Thus, the customer's statement may indicate that the transaction has been paid for in full or discounted, for example, by the bank or sponsor. In some embodiments, notifications may be sent to the customer's PDA, computer, telephone or other device. In some embodiments, notifications may be sent to the point-of-sale, such as, for example, a customer representative terminal, or point-of sale device or kiosk. Notifications may comprise text, audio or visual representations. In some embodiments, notifications may be provided at the point-of-sale, immediately, in real-time, shortly after a transaction is consummated, periodically, randomly, according to a schedule, at redemption, In some embodiments, the systems and methods described herein may permit customers to opt-in to participate in the program. For example, a customer (e.g., a card holding customer of a bank) may opt-in to participate in the program. In addition, a customer may opt-in to the program either online, by voice response unit (VRU), with the help of their banker at a branch, by receiving a targeted enrollment offer at an ATM, point-of-sale device or other terminal, or by any other technique or manner. A customer may selectively opt-in when an account is opened or anytime thereafter. In some embodiments, a customer may be automatically enrolled in the program at the time an account is opened, any time thereafter, or upon the occurrence of an event. In some embodiments, once a customer enrolls or is enrolled in the program the customer's transactions via an account, for example, may be tracked and prioritized or ordered along with the transactions of other customers and considered for a reward. For example, customer purchases may be sorted by date and time of when each was posted to their checking, credit, debit, savings, or any other type of account.

In some embodiments, the account through which customer transactions are tracked and considered for rewards may comprise an account associated or affiliated with a checking or savings account, a credit card, a debit card (e.g., a business banking debit card), a stored value card, RFID, and Equiline (Home Equity) access card, FOB card, any other card or identifier, or any other account through or to which transactions may be entered or posted. In some embodiments, transactions may be conducted over a telephone, computer, or other communication device. Transactions may also be conducted through contact or contact-less methods or devices.

In some embodiments, any numbers of parameters may be imposed to determine eligibility in the program or systems and methods described herein. For example, the program may be offered in specific geographic locations or in the entire country or world. Other selectable parameters may include, for example, only select customers or transactions are eligible to receive or redeem a reward; only select rewards are available to particular customers or transactions; only certain types of accounts are eligible to receive reward; only select entry modes (e.g., cards or other devices, RFID, contact-less online purchases, or other modes of entering into a transaction) are eligible; and only transactions through specific merchant categories qualify. Other parameters are of course possible.

In some embodiments, the various systems and methods described herein may permit a customer to use, redeem or expend, for example, earned reward points or other units of earned value to select particular transactions that are to receive or redeem a reward. For example, a customer may be presented with a listing or log of transactions that are eligible for a reward. In selecting a transaction or transactions, the customer may use "x" points that have been earned through previous transactions and that are maintained in a points bank in order to be able to select at least one transaction from the listing or log presented. The points redeemed may be converted to dollars and added to the customer's checking account, for example. That is, points are used initially to enter into a transaction and debited from the points account, and dollars are subsequently added to the customer's account as the reward received on the particular transaction selected. In some embodiments, a user's card or transaction device may be associated with a points or other value bank of the user so that purchases made with the card are paid for using points.

According to one embodiment of the invention, a method for offering rewards. The method comprising the steps of: receiving at least one transaction occurrence relating to at least one account; ordering the at least one transaction occurrence based on an ordering scheme; selecting a winning transaction from the at least one transaction occurrence based on a reward selection scheme; and rewarding at least one reward to a user associated with the winning transaction. In some embodiments, a customer may select or determine the parameters to be considered in determining transactions to automatically receive rewards.

In yet another embodiment of the invention, a system for identifying and offering rewards is provided. The system comprising: a transaction reception module or processor for receiving at least one transaction occurrence; an ordering module or processor for ordering the at least one transaction occurrence based on an ordering scheme; and a rewards selection module or processor for rewarding at least one reward to a user associated with at least one of the at least one transaction occurrence based on a reward selection scheme.

In yet another embodiment of the invention, a method for offering a reward is provided. The method comprising the steps of: receiving at least one transaction occurrence, wherein the at least one transaction occurrence is associated with a user or account; assigning at least one reward value to the at least one transaction occurrence, wherein the at least one reward value is based on the amount of the at least one transaction, the identity of the user or account, the identity of a sponsor, or any other particular associated with the at least one transaction; storing the at least one reward value in a rewards database; generating a statement to the user based on the at least one transaction occurrence, wherein the statement lists each of the at least one transaction occurrence and a balance of receiving a transaction selection from the user designating a transaction; and applying at least a portion of the at least one reward value to a balance corresponding to the designated transaction.

In yet another embodiment of the invention, a method for offering rewards is provided. The method comprising the steps of: receiving at least one transaction occurrence relating; selecting a winning transaction from the at least one received transaction occurrence based on a reward selection scheme; and applying at least one reward to the winning transaction.

In yet another embodiment of the invention, a method for redeeming rewards at the point of purchase is provided. The method comprising the steps of: receiving a transaction particular associated with a purchase by a user; notifying the user that rewards or other redeemable value is available to be applied against the transaction; receiving a selection from the user on whether to pay with reward points; redeeming select rewards or other redeemable value against the transaction amount; and treating any balance owed as a split tender.

In another embodiment of the invention, a method for offering rewards, is provided. The method comprising the steps of: receiving a plurality transaction occurrences from a plurality of merchants relating to at least one account; ordering the plurality of transaction occurrences based on an ordering scheme; selecting a winning transaction from the plurality of transaction occurrences based on a reward selection scheme; and rewarding at least one reward to a user associated with the winning transaction.

In yet another embodiment of the invention, a system for identifying and offering rewards is provided. The system comprising: a transaction reception module or processor for receiving a plurality of transaction occurrences from a plurality of merchants; an ordering module or processor for ordering the plurality of transaction occurrences based on an ordering scheme; and a rewards selection module or processor for rewarding at least one reward to a user associated with at least one of the plurality of transaction occurrences based on a reward selection scheme.

A method for offering a reward, comprising: receiving a plurality of transaction occurrences from a plurality of merchants, wherein each of the plurality transaction occurrences is associated with a user or account; assigning at least one reward value to at least one of the plurality of transaction occurrences, wherein the at least one reward value is based on the amount of the at least one transaction, the identity of the user or account, the identity of a sponsor, or any other particular associated with the at least one transaction; storing the at least one reward value in a rewards database; generating a statement to the user based on the at least one of the plurality of transaction occurrences, wherein the statement lists each of the at least one transaction occurrence and a balance of receiving a transaction selection from the user designating a transaction; and applying at least a portion of the at least one reward value to a balance corresponding to the designated transaction.

A method for offering rewards, comprising the steps of: receiving a plurality of transaction occurrences from a plurality of merchants relating to a user or account; selecting a winning transaction from the plurality of received transaction occurrences based on a reward selection scheme; and applying at least one reward to the winning transaction.

DETAILED DESCRIPTION OF EXEMPLARY EMBODIMENTS

Figure 1:
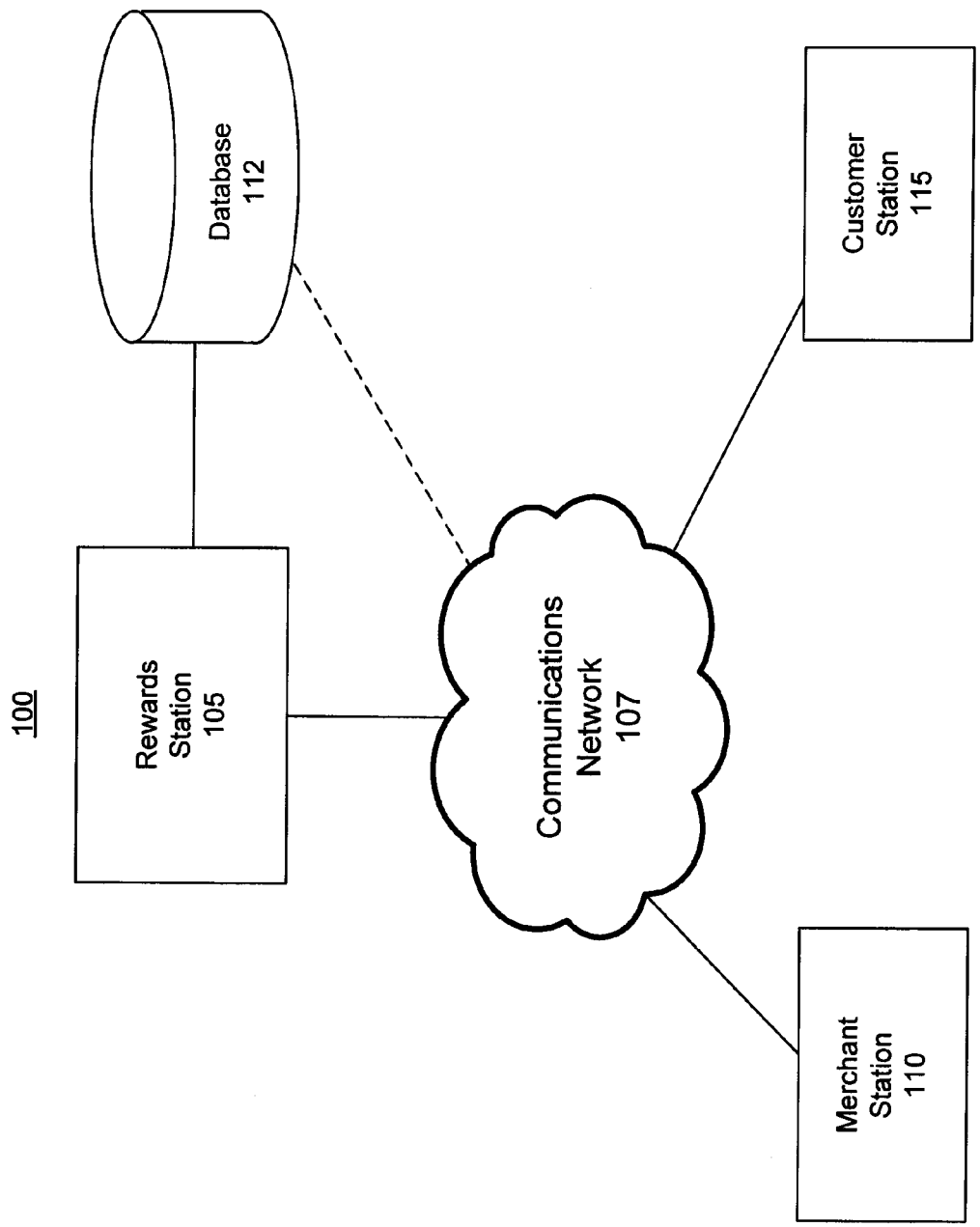
FIG. 1 shows an exemplary system 100 for offering rewards, according to various embodiments of the invention.

Reference will now be made to the present preferred embodiments of the invention, examples of which are illustrated in the accompanying drawings in which like reference characters refer to corresponding elements.

The present invention is described in relation to a system and method for identifying, prioritizing and offering rewards. Nonetheless, the characteristics and parameters pertaining to the system and method may be applicable to transactions associated with other types of promotions and incentive programs.

While the exemplary embodiments illustrated herein may show the various embodiments of the invention (or portions thereof) collocated, it is to be appreciated that the various components of the various embodiments may be located at distant portions of a distributed network, such as a local area network, a wide area network, a telecommunications network, an intranet and/or the Internet, or within a dedicated object handling system. Thus, it should be appreciated that the components of the various embodiments may be combined into one or more devices or collocated on a particular node of a distributed network, such as a telecommunications network, for example. As will be appreciated from the following description, and for reasons of computational efficiency, the components of the various embodiments may be arranged at any location within a distributed network without affecting the operation of the respective system.

FIG. 1 illustrates a system 100 for offering rewards according to one embodiment of the invention. System 100 may comprise a reward station 105 for identifying and offering reward categories based on customer particulars, such as past transactions and expressed interests and needs. In some embodiments, rewards station 105 may be administered by a bank or financial institution, for example, that issues, maintains or administers cards (e.g., a card-issuer) or accounts, a merchant or vendor that sponsors rewards (e.g., a sponsor), or any third party that, for example, coordinates, manages or administers customer interaction with merchants 110 via cards, accounts and corresponding rewards programs. In some embodiments, rewards station 105 may maintain particulars about customers, rewards, sponsors, and any data and information that may be used to offer rewards according to the systems and methods described herein. In some embodiments, rewards station 105 may comprise the central headquarters or repository of the various features and functions of the systems and methods described herein, and may be maintained by any party or entity that administers the coordination of data and information in connection with the offering of rewards according to the systems and methods described herein.

Rewards station 105 may comprise a single server or engine (as shown). In another embodiment, rewards station 105 may comprise a plurality of servers or engines, dedicated or otherwise, which may further host modules for performing desired system functionality. Rewards station 105, for example, may host one or more applications or modules that function to permit interaction between the users of system 100 (e.g., sponsors, customers, the administrator of rewards station 105, and any other relevant parties) as it relates to exchanging and processing of data and information related to the offering of rewards, for example. For instance, rewards station 105 may include an administration module that serves to permit interaction between the system 100 and the individual(s) or entity(ies) charged with administering system 100 or rewards station 105. Such an administration module may enable the agent of rewards station 105, for example, to input information related to rewards, including but not limited to parameters used to order or prioritize transactions or to select transactions which will be offered rewards. Such parameters may comprise variables, algorithms or formulas, for example, that define an ordering or prioritization scheme or a reward selection scheme for issuing rewards as described herein.

According to various embodiments, an agent of rewards station 105 may interface with a graphical user interface (or GUI) to input: (1) data or information (e.g., terms, words, phrases, or digits) that enable the agent to define particular customers or transactions that are eligible to participate and receive rewards, (2) data or information that enable the agent to define particular transaction ordering or prioritization or reward selection schemes, (3) data or information that enable the agent to define particulars about sponsors or other merchants or vendors through which rewards will be delivered or made available, (4) rules, parameters and algorithms used to identify which rewards to offer to customers, (5) data or information used to notify customers that a rewards has been issued or made available, (6) information or data regarding how customers, transactions or rewards are stored (e.g., categorized) in a database 112, for example and (7) data or information used to perform or carry any of the features or functionality described herein. Other modules may permit processing of the various features and functionality described herein for offering rewards (See FIG. 2 for modules associated with rewards station 105).

Rewards station 105 may include, for instance, a workstation or workstations running the Microsoft Windows™ XP™ operating system, Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2 system, the BeOS™ operating system, the Macintosh operating system, the Apache operating system, an OpenStep™ operating system or another operating system or platform.

Data and information maintained by rewards station 105 may be stored and cataloged in database 112 which may comprise or interface with a searchable database. Database 112 may comprise, include or interface to a relational database. Other databases, such as a query format database, a Standard Query Language (SQL) format database, a storage area network (SAN), or another similar data storage device, query format, platform or resource may be used. Database 112 may comprise a single database or a collection of databases, dedicated or otherwise. In one embodiment, database 112 may store or cooperate with other databases to store the various data and information described herein. In some embodiments, database 112 may comprise a file management system, program or application for storing and maintaining data and information used or generated by the various features and functions of the systems and methods described herein. In some embodiments, database 112 may store, maintain and permit access to customer information, sponsor or reward information, and general information used to offer rewards as described herein.

Rewards station 105 may, in some embodiments, be accessed via a communication network 107. Communications network 107 may be comprised of, or may interface to any one or more of, the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, a V.34 or a V.34bis analog modem connection, a cable modem, an Asynchronous Transfer Mode (ATM) connection, a Fiber Distributed Data Interface (FDDI) connection, or a Copper Distributed Data Interface (CDDI) connection.

Communications network 107 may also comprise, include or interface to any one or more of a Wireless Application Protocol (WAP) link, a General Packet Radio Service (GPRS) link, a Global System for Mobile Communication (GSM) link, a Code Division Multiple Access (CDMA) link or a Time Division Multiple Access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based radio frequency link. Communications network 107 may further comprise, include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

In some embodiments, communication network 107 may comprise a satellite communications network, such as a direct broadcast communication system (DBS) having the requisite number of dishes, satellites and transmitter/receiver boxes, for example. Communications network 107 may also comprise a telephone communications network, such as the Public Switched Telephone Network (PSTN). In another embodiment, communication network 120 may comprise a Personal Branch Exchange (PBX), which may further connect to the PSTN. Communications network 107 may also comprise a transaction network, such as a credit or debit processing network, or any other network through which transactions may be processed.

As shown in FIG. 1, merchant station 110 and customer station 115 may communicate with reward station 105 via communication network 107. Merchant station 110 may comprise, for example, a station or terminal utilized by an agent of a card or account issuer or a sponsor or other merchant or vendor to interact or communicate with customers or reward station 105. For example, station 110 may comprise a point-of-sale (POS) terminal, a call center facility or station of a card or account issuer or sponsor that is manned by an operator to receive calls from customers, or other terminal that a card or account issuer or a sponsor or other merchant or vendor may use to communicate with a customer or reward station 105. In some embodiments, merchant station 110 may comprise or host web site(s), web page(s) or other interfaces of the card or account issuer, sponsor or other merchant or vendor, for example, that a customer can access or interact with to make purchases or enter into other transactions with the card or account.

Customer station 115 may, in some embodiments, enable a customer to interact with, make purchases or other transactions, or communicate with a card or account issuer or sponsor, merchant or other vendor as represented by merchant station 110. For example, customer station 115 may enable a customer to call or access the web site or page of a card or account issuer or sponsor to make purchases, inquire about account particulars, make payment on an account, or inquire about available balance, for example. In some embodiments, customer station 115 may comprise any terminal (e.g., a typical home or personal computer system) whereby a customer may interact with a network, such as communications network 107, for example, that is responsible for transmitting and delivering data and information used by the various systems and methods described herein. Customer station 115 may comprise or include, for instance, a personal or laptop computer. Customer station 115 may include a microprocessor, a microcontroller or other general or special purpose device operating under programmed control. Customer station 115 may further include an electronic memory such as a random access memory (RAM) or electronically programmable read only memory (EPROM), a storage such as a hard drive, a CDROM or a rewritable CDROM or another magnetic, optical or other media, and other associated components connected over an electronic bus, as will be appreciated by persons skilled in the art. Customer station 115 may be equipped with an integral or connectable cathode ray tube (CRT), a liquid crystal display (LCD), electroluminescent display, a light emitting diode (LED) or another display screen, panel or device for viewing and manipulating files, data and other resources, for instance using a graphical user interface (GUI) or a command line interface (CLI). Customer station 115 may also include a network-enabled appliance, a browser-equipped or other network-enabled cellular telephone, or another TCP/IP client or other device.

Figure 1A:
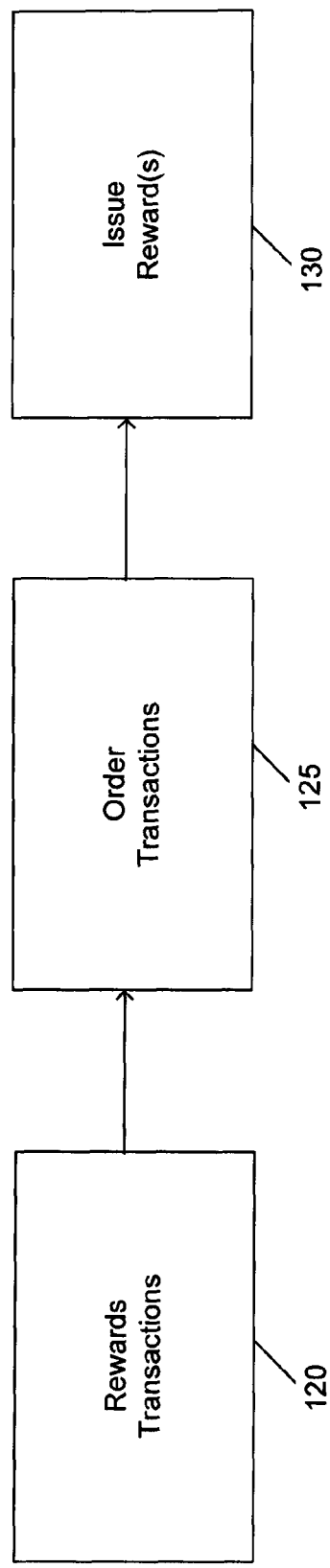
FIG. 1*a* illustrates a process flow 118 for offering rewards, according to various embodiments of the invention.

FIG. 1a illustrates an exemplary process flow 118 for offering rewards, according to one embodiment of the system and methods described herein. At step 120, any number of transactions are received by rewards station 105. In some embodiments, such transactions correspond to the transactions of any number of customers throughout the world. The receipt of transactions by rewards station 105 may comprise the reception of transaction particulars such as, for example, the date or time of a transaction, the type of transaction (e.g., purchase, balance inquiry, payment, transfer, etc.), the identity or location of the customer, card or account, the customer, card or account transaction history, the amount of a transaction (e.g., purchase amount, transfer amount, payment amount, etc.), the identity or location of a sponsor or other merchant or vendor through which the transaction is entered, the product or service purchased or sold, or any other particular of a transaction that may be used to order or prioritize transactions, select customers or transactions to receive rewards, and otherwise offer rewards as described herein. In some embodiments, the transactions are received over a particular period of time, such as, for example, daily, weekly, monthly At step 125, rewards station 105 may order or prioritize the received transactions according to any given scheme, rule or algorithm. For example, transaction particulars may be used to order or prioritize transactions into a particular list that can then be used to select a particular transaction(s) or customer(s) to receive or redeem a reward. Such ordering or prioritization may be based on any of the transaction particulars described above in step 120. For example, transactions may be ordered or prioritized based on a time or date; amount spent or transacted; identity, location or type of merchant or vendor; identity or type of product or service purchased or transacted; identity, location or type of customer; identity, location or type of transaction; or any other particular that may be used to order and prioritize transactions or customers.

At step 130, a transaction(s) or customer(s) from the ordered or prioritized list is selected to receive or redeem a reward. In some embodiments, selection of a transaction or customer may be based on any selection scheme, rule or algorithm. Such selection scheme, rule or algorithm may be based on a random selection; the customer with the most transactions; the customer with the greatest amount or total amount spent or transacted; the customer that shopped or transacted with a particular merchant or vendor (specific or type); the largest transaction amount; the largest non-purchase transaction; first or most occurrence of a particular transaction type; or any other scheme, rule or algorithm that may be used to offer rewards in the manner described herein. In some embodiments, the reward may comprise paying for or covering the particular transaction selected. Thus, if the selected transaction is a customer's $500 purchase of a television set, the reward may comprise paying for the television set on behalf of the customer. In some embodiments, the systems and methods described herein may reimburse the customer the amount of the transaction. Thus, instead of paying for the $500 on behalf of the customer, the systems and methods described herein may simply reimburse the customer the $500. In some embodiments, a reward is given by the issuer or administrator of a card or account used to make the purchase, a sponsor of the reward, a merchant or vendor, the administrator of rewards station 105, or any other individual or entity that may issue rewards through the systems and methods described herein. Other rewards are possible. In some embodiments, the customer associated with the selected transaction(s) may be notified in any appropriate manner, such as, for example, via electronic mail, instant messaging, electronic statement or other electronic means, or mail, telephone or other appropriate manner. In some embodiments, a customer may be offered a choice of rewards to select from. In some embodiments, if a customer subsequently returns a rewarded item, the various systems and methods described herein may charge the appropriate amount to the customer's account or otherwise obtain reimbursement directly from the merchant or other party. For example, if the customer returned the $500 television set after being reimbursed the cost, the merchant where the television set was returned may inform the administrator of the systems and methods described herein of the return so that appropriate reconciliation may be accomplished.

Figure 2:
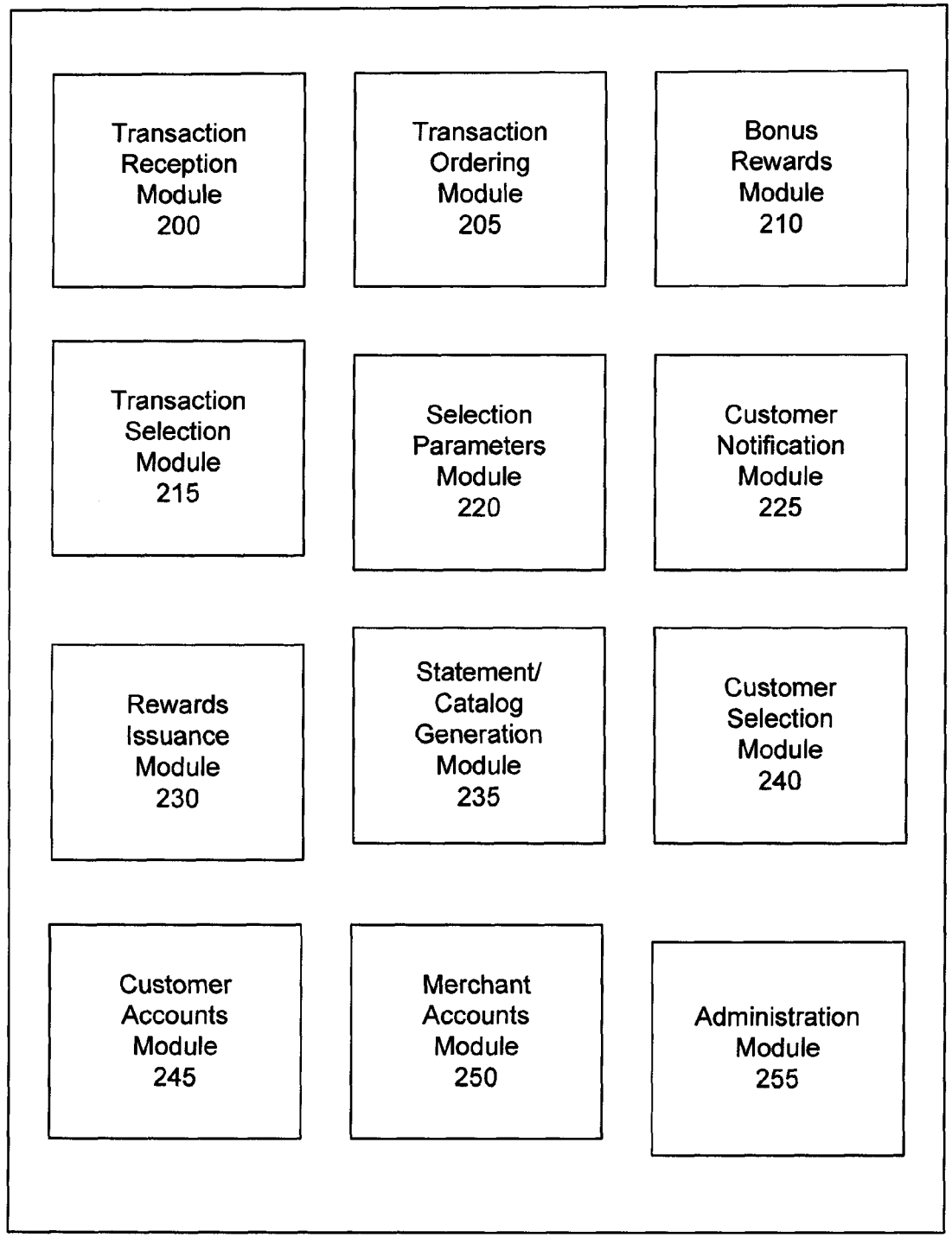
FIG. 2 illustrates various exemplary modules that may be associated with rewards station 105, according to various embodiments of the invention.

FIG. 2 illustrates exemplary modules that may be associated with central rewards station 105 for carrying out (or administering) the various functions and features of the embodiments described herein. While the modules may not be used in all embodiments to perform some or all of the functions of the present invention, they are nonetheless presented as possible embodiments:

Transaction reception module 200 may, in some embodiments, receive customer transactions that are made or entered into by a customer with a card or account, for example. In some embodiments, transaction reception module 200 may interact with any transaction network (e.g., ATM, Visa, MasterCard), for example, through which purchase or other transactions are conducted and receive therefrom transaction particulars that are used by the various systems and methods described herein to offer rewards. For example, transaction reception module 200 may receive from any number of sponsors or other merchants or vendors particulars of transactions entered into by a customer using a card or account, for example. Such particulars may include, for example, the date or time of a transaction, the type of transaction (e.g., purchase, balance inquiry, payment, transfer, etc.), the identity or location of the customer, card or account, the customer, card or account transaction history, the amount of a transaction (e.g., purchase amount, transfer amount, payment amount, etc.), the identity or location of a sponsor or other merchant or vendor through which the transaction is entered, the product or service purchased or sold, or any other particular of a transaction that may be used to order or prioritize transactions, select customers or transactions to receive rewards, and otherwise offer rewards as described herein. In some embodiments, transaction reception module 200 may receive particulars on transactions that are entered into with cash. For example, the merchant or vendor in a transaction paid for in cash may provide any of the above transaction particulars to transaction reception module 200. In some embodiments, transaction reception module 200 may organize and otherwise queue transactions received for further processing by the systems and methods described herein.

Transaction ordering module 205 may, in some embodiments, order or prioritize customer transactions that have been received by transaction reception module 200. Such ordering or prioritization may be used to designate a listing of customers or transactions that are eligible to receive or redeem a reward according to the systems and methods described herein. In some embodiments, transaction ordering module 205 may prioritize or order transactions by date or time. For example, transactions entered into by any number of customers may be queued and organized so that the most recent transaction occurs first and the oldest transaction appears last on the list. Of course, the listing may be ordered such that that oldest transaction appears first and the most recent appears last. Other ordering or prioritization schemes are possible.

In another example, ordering or prioritization module 205 may organize or prioritize transactions based on the amount of the transaction. For example, transactions of all customers may be organized or prioritized based on the amount spent on particular goods or services, transferred from an account, withdrawn, paid, or otherwise transacted. Thus, a customer who spent $1,000 on the purchase of a television set would be listed higher (or lower, depending on the particular ordering scheme being used) than a customer who purchased a $500 bicycle. In some embodiments, transactions may be ordered irrespective of the transaction type. Thus, an ATM withdrawal of $1,000 would rank higher (or lower) than a purchase for $300. In some embodiments, only select transactions may be considered for rewards. For example, the systems and methods described herein may only consider transactions where a purchase was made. Other parameters are of course possible. The designation of transactions that are eligible to receive rewards may be made by the customer, the administrator of the systems and methods described herein, a merchant, or any other individual or entity that may make such designations.

In some embodiments, customers may be ordered and prioritized based on the total amount of transactions entered into during a particular period of time. For example, assume the customer spends $135 at a restaurant, $233 on groceries, $50 at a gas station, withdraws $200 from an ATM, and transfers $500, all on a given day or over the course of a period of time. For ordering or prioritization purposes, the customer may be considered to have $1,118 in transactions, or the total sum of the above transactions. In some embodiments, only select transaction types (or other transaction particular(s)) is considered in determining total transaction amounts.

While the above ordering and prioritization schemes are offered as examples, transaction ordering module 205 may, of course, utilize any scheme, rules or algorithms to determine how customers or transactions are to be are to be prioritized or ordered. For example, any of the following transaction particulars may be used to order or prioritize transactions: the date or time of a transaction, the type of transaction (e.g., purchase, balance inquiry, payment, transfer, etc.), the identity or location of the customer, card or account, the customer, card or account transaction history, the amount of a transaction (e.g., purchase amount, transfer amount, payment amount, etc.), the identity or location of a sponsor or other merchant or vendor through or with which the transaction is entered into or processed, the product or service purchased or sold, or any other particular of a transaction that may be used to order or prioritize transactions, select customers or transactions to receive rewards, and otherwise offer rewards as described herein.

Bonus reward module 210 may, in some embodiments, issue bonus rewards based on any given transaction particular. For example, certain transactions may be counted multiple times or moved up or down the ordered or prioritized list generated during the ordering or prioritization stage so as to increase the likelihood that the transaction will be selected during the transaction selection stage. In some embodiments, a transaction amount may be increased as a bonus for meeting a specified criteria, such as, for example, shopping at a particular merchant or vendor, meeting a transaction or spending threshold, buying a particular product or service, conducting a particular transaction. Other criteria are possible. For example, assume a customer entered into $1,000 in transactions during the month of June. Assume further that the customer shopped at a particular retailer that is issuing bonus rewards in the form of an increased transaction amount (e.g., double amount) through the systems and methods described herein. Thus, if the customer purchased $100 worth of goods at the retailer, then the systems and methods described herein would register $200 worth of purchases through the retailer, leading to an amount total of $1100 for the customer. In some embodiments, the bonus reward may be increasing the number of transactions for the customer; creating new transactions for the customer.

In some embodiments, bonus rewards may be issued across transaction types. For example, if a customer shops at or conducts a particular with a particular merchant or vendor, the customer may be issued a bonus reward in the form of a free ATM or other transaction that will be added to the ordered or prioritized list of transactions. In some embodiments, the bonus reward given may be based on the particular reward selection scheme, rule or algorithm being utilized. Thus, if the reward is being given to the customer that shops the most at a given retailer, the bonus reward may comprise an additional transaction entry associated with that retailer. This way, the customer's chances of being selected for a reward can be increased. Other bonus reward schemes are possible. In some embodiments, any transaction particular may be used to determine which transactions or customers are selected to receive a bonus reward.

Transaction selection module 215 may, in some embodiments, select a transaction or transactions or customer or customers to receive or redeem a reward according to the systems and methods described herein. Customer or transaction selection may be made according to any selection scheme, rule or algorithm. Examples of such selection scheme, rule or algorithm may include, but are not limited to random selection or selecting the customer(s) or transaction(s) appearing at the top of the ordered or prioritized list. In some embodiments, the steps of ordering or the customer with the most transactions; the customer with the greatest amount or total amount spent or transacted, the customer that shopped or transacted with a particular merchant or vendor (specific or type), the largest transaction amount, the largest non-purchase transaction (e.g., a funds transfer, withdrawal, or deposit), first or most occurrence of a particular transaction type, or any other scheme, rule or algorithm that may be used to offer rewards in the manner described herein. For example, transaction selection module 215 may receive the ordered or prioritized listing and select therefrom the top entry on the list. In some embodiments, transaction selection module 215 may further process the transactions according to additional selection parameters. For example, the list may include the transactions in order by date or time. Transaction selection module 215 may then further process the transactions according to other selection parameters set forth above.

In some embodiments, the reward may comprise paying for, covering, or discounting the amount associated with the selected transactions. For example, a customer buying a $500 television set may wind up getting the television set for free or at a discount price if the amount is paid for by, for example, the issuer or administrator of a card or account used to make the purchase, a sponsor of the reward, a merchant or vendor, the administrator of rewards station 105, or any other individual or entity that may issue rewards through the systems and methods described herein. In some embodiments, the reward is applied without the customer becoming aware of the reward until such time as the customer checks the statement or is otherwise notified. For example, the customer may see in his statement that the outstanding balance for the television set has been reduced to zero. In some embodiments, the reward may be extending the due date for the payment or suppressing the accumulation of interest on the outstanding balance of a transaction. In some embodiments, the customer may be given a list of rewards to choose from to apply against the selected transaction(s). In some embodiments, the customer may be given a reward and asked to designate a transaction to which it should be applied. Other rewards are possible.

Selection parameters module 220 may, in some embodiments, enable an agent of rewards station 105 a sponsor, merchant or vendor, for example, to designate parameters that are to be used as part of the ordering or prioritization schemes, rules or algorithms, or the customer or transaction selection schemes, rules or algorithms. For example, an agent of rewards station 105, a sponsor, merchant or vendor or any other individual or entity involved in the offering of rewards as described herein may designate particular schemes, rules or algorithms to use in particular situations or promotional campaigns In some embodiments, such designations may be made by interacting with an interface (e.g., a graphical user interface) that presents the agent of rewards station 105 a sponsor, merchant or vendor with selectable options of parameters. In some embodiments, such designations may be altered or modified as needed. In some embodiments, parameters may be selected so that a customer is offered the opportunity to select a transaction or transactions that is/are to receive or redeem a reward. For example, a customer may be presented with three (or any number) transactions and asked to select one which is to receive or redeem a reward.

Customer notification module 225 may, in some embodiments, notify a customer that a reward has been issued, has been applied against a transaction(s), or is available for redemption against a selected transaction(s). In some embodiments, a customer may be notified that the customer is being considered or is eligible to receive or redeem a reward for any number of transactions entered into by the customer. In some embodiments, the reward may be issued, applied against a transaction, or made available for redemption without the customer becoming aware of the reward until such time as the customer views the statement or is otherwise notified. For example, the systems and methods described herein may select a transaction(s) that is to receive or redeem a reward. In some embodiments, any number of possible rewards are determined and made available to be redeemed or applied against the selected transaction(s). The determined rewards are then presented to the customer as possible options to select from. The customer may select one of the proffered rewards, or, in some embodiments, may request a different reward be applied.

In some embodiments, the systems and methods described herein may notify the customer that he has the option of selecting a transaction(s) to receive or redeem a reward. For example, the systems and methods described herein may select a reward that is to be applied to a customer's transaction(s). The customer may be notified and queried to select any number of transactions that should receive all or a portion of the reward. Other notification schemes are possible. In some embodiments, notification to a customer may be made electronically, such as, for example, via electronic mail or instant messaging, via telephone, facsimile, over the mail, or other form of communication.

Rewards issuance module 230 may, in some embodiments, issue rewards as appropriate based on customer or transaction selections made by transaction selection module 215, for example, or a customer. For example, rewards issuance module 230 may interface and communicate with the appropriate systems (external or internal) to reconcile account balances whenever a reward results in the lowering or paying off of a customer's outstanding balance associated with a transaction. In some embodiments, reward issuance module 230 may interface and communicate with reward systems that may cooperate with the systems and methods described herein to issue and offer rewards. For example, if a selected reward is a particular discount, coupon, or other reward, incentive or promotion of a merchant or vendor, for example, the systems and methods described herein—particularly rewards issuance module 230—may interface and communicate with the appropriate systems of such merchant or vendor to fulfill the reward. In some embodiments, rewards issuance module 230 may interface and communicate with any systems that coordinate the generation, reconciliation and provision of notifications, customer statements, catalogs and other appropriate communications to ensure that accurate and reliable information is presented to the customer.

In some embodiments, rewards issuance module 230 may calculate reward points or other earned or redeemable value based on any transaction particular. For example, rewards issuance module 230 may issue reward points based on any transaction particular, such as, for example, the date or time of a transaction, the type of transaction (e.g., purchase, balance inquiry, payment, transfer, etc.), the identity or location of the customer, card or account, the customer, card or account transaction history, the amount of a transaction (e.g., purchase amount, transfer amount, payment amount, etc.), the identity or location of a sponsor or other merchant or vendor through which the transaction is entered, the product or service purchased or sold, or any other particular of a transaction that may be used to issue reward points or other earned or redeemable value. In some embodiments, earned points may be stored and accumulated in corresponding customer point accounts. In some embodiments, a customer may apply earned reward points or other earned or redeemable value against outstanding balances. In some embodiments, rewards issuance module 230 may confirm that a customer has sufficient points to pay for a transaction, and may further reconcile the customer's account so that any funds which have been applied against the transaction are reimbursed or credited.

Statement/Catalog generation module 235 may, in some embodiments, present a customer associated with a selected transaction, for example, a statement that indicates the reward(s) obtained and/or the transactions selected. For example, if the customer's transaction involving the purchase of groceries at a grocery store is selected as the recipient of a reward by the systems and methods described herein, statement/catalog generation module 235 may present the customer with an electronic or paper statement indicating that the transaction has been paid off or discounted, for example, or that some other reward has been applied thereto. In some embodiments, statement/catalog generation module 235 may generate a catalog of rewards that the customer may utilize to select a reward(s) to apply to the selected transaction(s). In some embodiments, the statement or catalog may comprise a list of transactions that the customer may select from to designate a transaction(s) that is to receive the benefit of a reward. In some embodiments, the statement or catalog may offer the customer the opportunity to select a transaction and a reward. Such statement or catalog may be presented with the notification to the customer that a transaction has been selected or reward has been issued, applied or made available for redemption, while in some embodiments the statement or catalog may comprise the notification.

In some embodiments, the statement or catalog may be interactive such that a customer may, among other things, select a reward or transaction, decline a proffered reward or selected transaction, or request that the reward or selected transaction be changed or modified. For example, a statement or catalog may include any number of icons the customer may initiate to express its approval, denial or designation of a reward(s) or transaction(s). For example, a statement or catalog may indicate that a particular transaction was paid for, and afford the customer the opportunity to request that another transaction be the recipient of the reward or that another reward be applied. The statement or catalog may provide alternative options for the customer to specify that another transaction should receive the benefit. In some embodiments, the customer's request may be considered by the systems and methods described herein and a determination made as to whether the requested selection (e.g., a desired transaction or reward) is appropriate. In some embodiments, the statement or catalog is presented to the customer electronically, such as through electronic mail or instant messaging, for example, presented or made available to the customer via a web site or other interface, or presented in paper or other tangible form over the mail or any appropriate form of communication.

Customer selection module 240 may, in some embodiments, receive and process user input, designations or selections in connection with the selection of a reward or the selection of a transaction to receive the benefit of the reward. For example, upon being notified that a reward is available for redemption, customer selection module 240 may receive and process customer input relating to which transaction(s) the customer wants to receive the benefit of the reward. Similarly, customer selection module 240 may receive and process user input designating which reward(s) the customer wants to receive. In some embodiments, customer selection module 240 may determine whether a customer designation or selection is appropriate. For example, assume the systems and methods described herein select a particular transaction and apply a particular reward to the transaction. Upon being notified, the customer may express a desire—e.g., by interacting with a statement or catalog—that a different transaction receive the benefit, or that a different reward be applied to the selected transaction. Customer selection module 240 may receive the customer's input and determine whether the designation or selection is appropriate. In so doing, customer selection module 240 may consider, for example, rewards and transactions that are available to the customer, as well as any other data or information that may be relied upon to determine whether a customer's input or designation is appropriate. If the customer's input is appropriate, customer selection module 240 may further interface ensure that the proper reward(s) or transaction(s) are effected. If the input is not proper, however, customer selection module 240 may so inform the customer or proceed with a default or other proper reward or transaction selection.

Customer accounts module 245 may, in some embodiments, process and maintain data and information relating to customers, such as, for example, the identity of the customer, the location (e.g., residential or work address) of the customer, the customer's preferred or favorite merchants, vendors, products or services, the card(s) or account(s) associated with the customer, preferred transactions, the rewards associated with the customer, or any other data or information that may be used to dynamically identify, prioritize or order transactions, or select rewards or transactions according to the systems and methods described herein. In some embodiments, customer accounts module 245 may cooperate with the various modules described herein, for example, to associate customers with particular rewards to enable the various systems and methods described herein to dynamically select transactions and identify and offer rewards that are relevant and of interest to customers.

In some embodiments, customer accounts module 245 may, in some embodiments, process and maintain data and information relating to customer transactions. For example, customer accounts module 245 may, for a particular customer or customer, maintain and update data and information on any and all transactions (e.g., purchases) that the customer has processed or entered into, including the date of the transaction, the identity of the merchant or vendor, type of transaction, the amount of the transaction, the location of the transaction, the goods or services purchased (e.g., identified by SKU number), the reward earned (e.g., redeemable points, cash, sponsor or issuer redeemable value), or any other data or information that may be used to classify the transaction in such a way that it may be used to identify and offer rewards according to the systems and methods described herein. In some embodiments, customer accounts module 245 may also process and maintain data and information relating to customer transaction and rewards selections made by the customer or carried out by the systems and methods described herein.

Merchant accounts module 250 may, in some embodiments, maintain data and information on particular sponsors and other merchants and vendors, such as, for example, particular rewards that may be offered as a result of transactions with a particular merchant or vendor. In some embodiments, merchant accounts module 250 may maintain data and information on the types of transactions that may be rewarded, the customers that may receive rewards, and any other data or information that may be used to select transactions, customers or rewards as described herein. For example, merchant accounts module 250 may maintain data indicating that merchant A only wants to give rewards associated with purchases of a minimum amount, or that only customer in a particular state or geographic region, for example, are eligible to receive or redeem a reward. Other merchant parameters and preferences are possible. In some embodiments, particular sponsors or other merchants or vendors may selectively designate or modify parameters or preferences, such as by interacting with merchant accounts module 250 via merchant station 110, for example.

Administration module 240 may, in some embodiments, enable an administrator of rewards station 105, for example, to interact with the various modules, features and functionality described herein. For example, an agent of rewards station 105 may interact with administration module 255 to input, revise and remove data and information used by the various systems and methods described herein, such as, for example, customer information, transaction or reward information, or any other data or information that may be used to identify and offer reward to customers as described herein. In some embodiments, administration module 255 may enable an administrator of rewards station 105 to establish parameters or rules associated with the various features and functionality described herein. For example, an administrator may establish rules depending on specific business needs or fees associated with a merchant or vendor, or customer's use of the features and functionality described herein. Thus, a customer may be limited to a predetermined number of transaction or reward selections over a predetermined period of time, such as annually or monthly, for example. Other predetermined periods of time are of course possible. A customer may also be required to pay a fee to be able to be able to switch transactions or rewards. Such a fee may be, for example, annually or monthly imposed or may be charged on a one-time or per-transaction basis. In some embodiments, the fee may comprise a monetary amount or any other form of value. In some embodiments, delays may be imposed to verify that a particular exchange or movement of points was done properly and in good-faith (e.g., accrue rewards before they are actually available for redemption).

Figure 3:
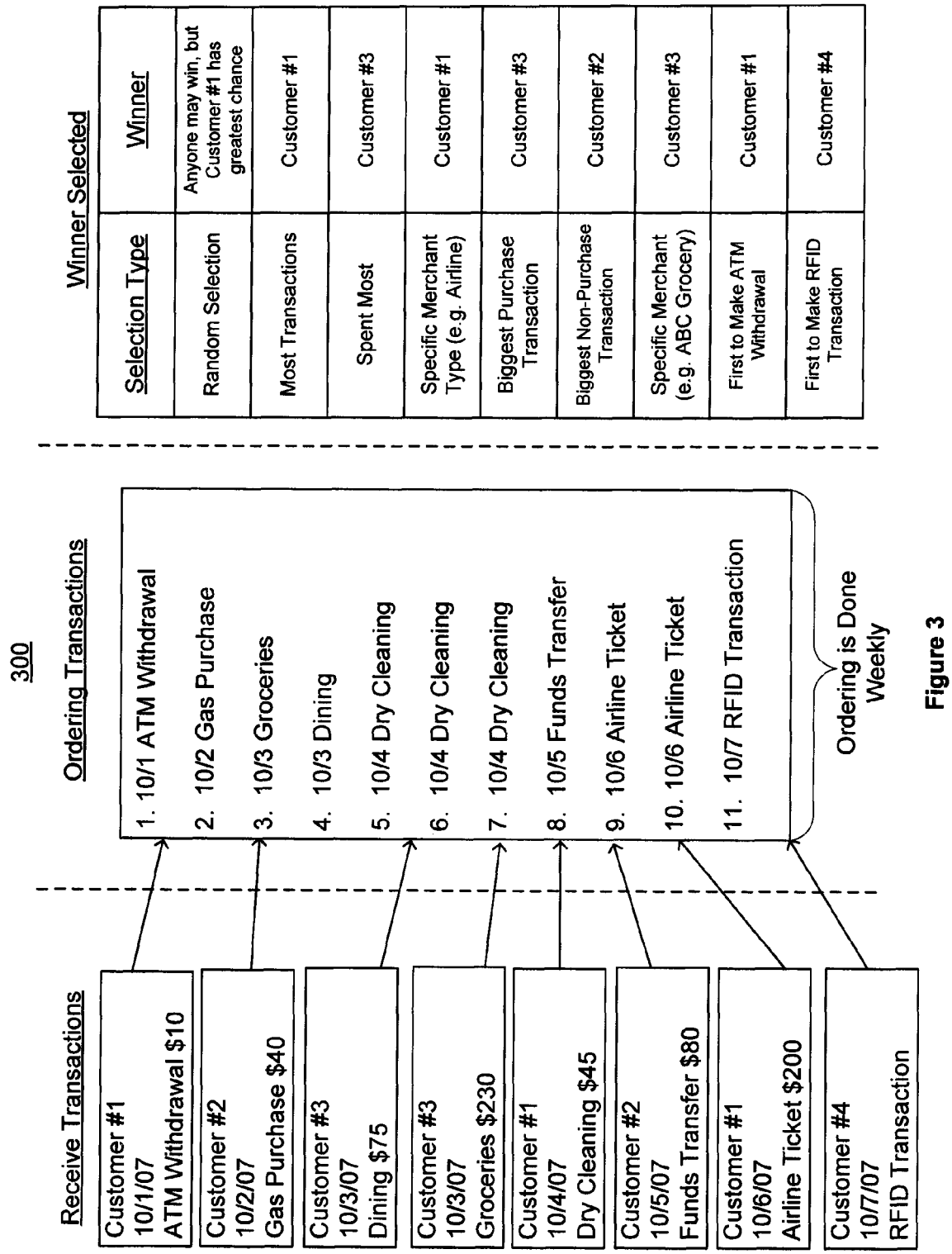
FIG. 3 illustrates an exemplary process flow 300 for offering rewards, according to various embodiments of the invention.

FIG. 3 illustrates a process flow 300 for offering rewards, according to an embodiment of the systems and methods described herein. In particular, FIG. 3 depicts the three stages of processing set forth in FIG. 1*a* above, namely: the reception of transactions; the ordering of transactions; and the selection of a winning transaction. As shown, the transaction reception stage shows seven (7) transactions being entered into by customers #1, #2 and #3. In this example, customer #1 has entered into three (3) transactions, customer #2 into two (2) transactions, and customer #3 into two (2) transactions. Each of the individual transactions is received by remote station 105 as described herein. In some embodiments, transactions received may correspond to a single customer, while in some embodiments transactions may be received from a plurality of customers, as shown. Once received, the transactions are then ordered or prioritized into a listing according to a particular ordering or prioritizing scheme, rule or algorithm. As shown, the transactions are ordered on a weekly basis according to date. Thus, during the week of Oct. 1, 2007, for example, the ordered listing of transactions would start with customer #1's ATM withdrawal of $10 on October $1^{st}$ and end with customer #1's purchase of an airline ticket on October $6^{th}$. Of course, the transactions may be ordered hourly, daily, monthly, or according to any other time schedule, predetermined, random or otherwise. Similarly, other ordering or prioritization schemes, rules or algorithms may be utilized. Also shown in the listing of ordered transactions is the issuance of bonus rewards in the form of multiple entries for a single transactions. For example, transactions #s 6, 7 and 10 are repeated entries for the transaction #s 5 and 9, respectively. More specifically, bonus rewards in the form of two additional entries are issued for entering into transactions with a particular dry cleaning establishment, hence additional transaction #s 6 and 7, and an additional entry is added for purchases through a particular airline, hence additional transaction #10. Other schemes, rules or algorithms are possible for determining and issuing bonus rewards.

Once the transactions are ordered and prioritized, a winning customer or transaction may be selected. In some embodiments, the winning customer or transaction may be selected according to a particular selection scheme, rule or algorithm. For example, if the selection scheme is the first transaction or customer listed, then customer #1 would win because his is the first transaction appearing on the list. If the selection scheme is random selection, then anyone may win, but note that customer #1 has the greatest chance of winning given that he has three (3) transactions in comparison to customers #2 and #3, each of which has two (2) transactions. If the selection scheme is the most transactions, then customer #1 would win. If the selection scheme is who spent the most, then the winner would be customer #3 because he spent a total of $305 (not including bonus rewards). If, however, bonus rewards are included, then customer #1 would win. Other selection schemes, rules or algorithms are possible, including, for example, the other selection schemes, rules or algorithms shown in FIG. 3.

Once a winning customer or transaction is selected, the systems and methods described herein may notify the customer of the reward and either designate a reward and transaction to realize the reward, or permit the winning customer to designate a reward or a transaction to realize the reward, such as through an interactive statement or catalog, for example. Thus, if the first entry in the ordered list wins, then the systems and methods described herein may deposit $10 in the account from which customer #1 withdrew $10 via an ATM. In some embodiments, the system and methods described may reward $10 to customer #1 and have him designate which transaction(s) should realize the benefit. For example, customer #1 may opt to apply some or all of the $10 reward towards the $45 balance associated with dry cleaning. In some embodiments, customer #1 may request that, rather than receiving $10, no interest be charged on his outstanding balances on all transactions for a month. In some embodiments, the systems and methods described herein may determine whether the customer's request is appropriate. Other possibilities for selecting transactions or rewards are possible.

Figure 4:
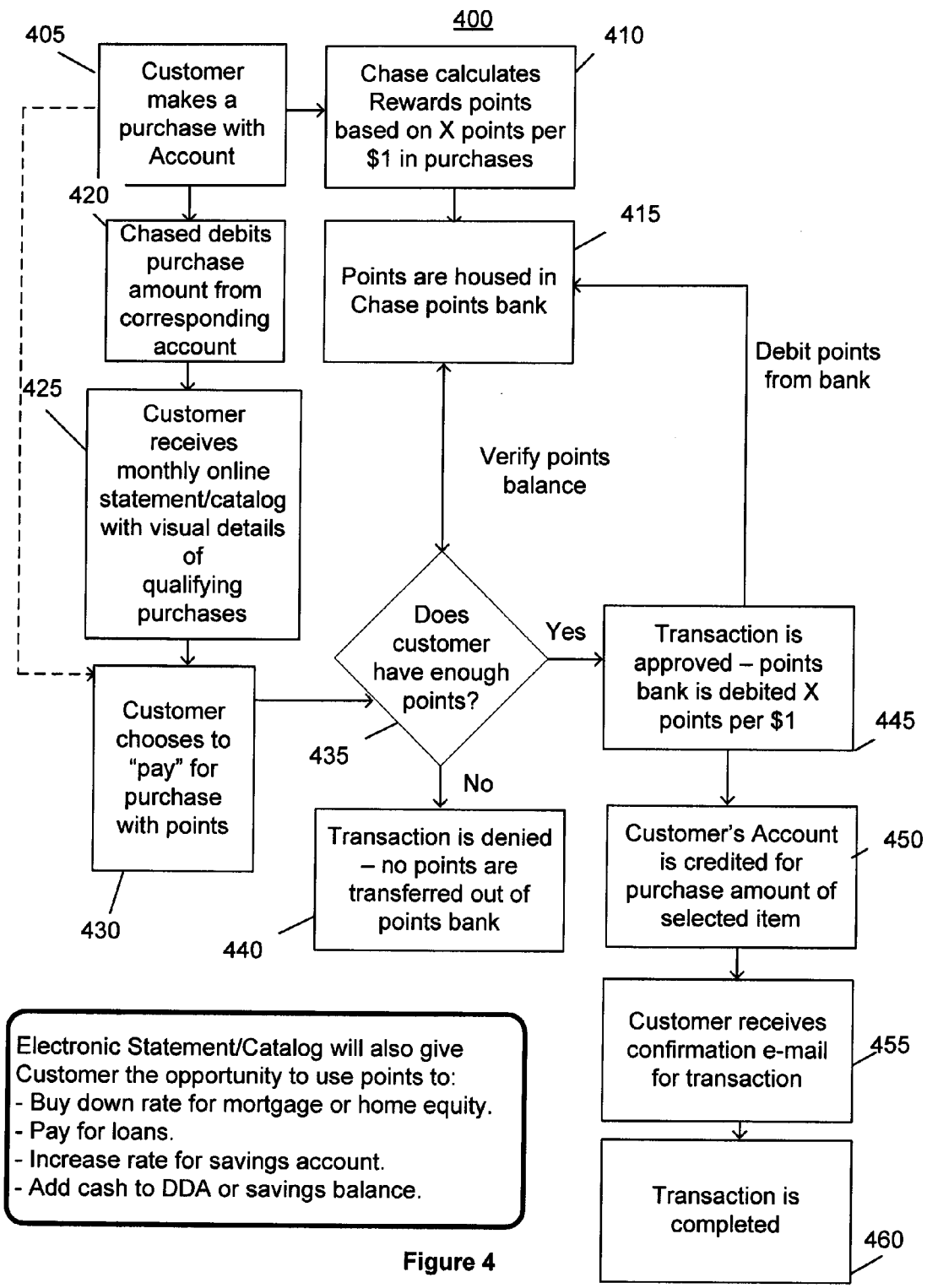
FIG. 4 illustrates an exemplary process flow 400 for offering rewards, according to various embodiments of the invention.

FIG. 4 illustrates a process flow 400 for offering rewards, according to an embodiment of the systems and methods described herein. In some embodiments, the systems and methods described herein may permit a customer to resolve balances or transactions with accumulated reward points or other earned value. For example, at step 405 a customer makes a purchase using a card or account (or cash). At step 410, reward station 105 may calculate reward points based on the amount spent on the transaction. At step 415, the points earned are stored in a points account. In some embodiments, the account may be associated with the particular customer. At step 420, if the purchase was made with a card or account, the purchase amount of the transaction is debited from the corresponding account. At step 425, the customer may receive an statement or catalog (online or paper) with details of the purchases, such as, for example, a list of purchases or transactions that the customer may apply earned points to. In some embodiments, the statement or catalog may be interactive. At step 430, the customer may choose which transaction(s) he would like to pay for with points. In some embodiments, a customer may proceed from step 405 directly to step 430, as indicated by the dashed line. At step 435, a determination is made as to whether the customer has enough points. In some embodiments, if the customer does not have enough points, then only the available points may be applied against the selected transaction(s). If the customer has enough points, then the transaction is approved and the points bank is debited the appropriate number of points, otherwise the transaction is denied at step 440. In some embodiments, the appropriate number of points is based on a predetermined ratio between points and cash, for example, or according to any scheme, rule or algorithm. At step 450, the customer's account may be credited for the purchase amount for the selected transaction(s). At step 455, the customer may receive a notification (e.g., an email) confirming the points transaction. At step 460, the transaction is completed. In some embodiments, points earned may be used to buy down a rate for a mortgage or home equity or other loan; pay for loans any other balance; increase rate for savings account; add funds to accounts or savings; and any other transaction that involves funds, cash or other value, for example.

Figure 5:
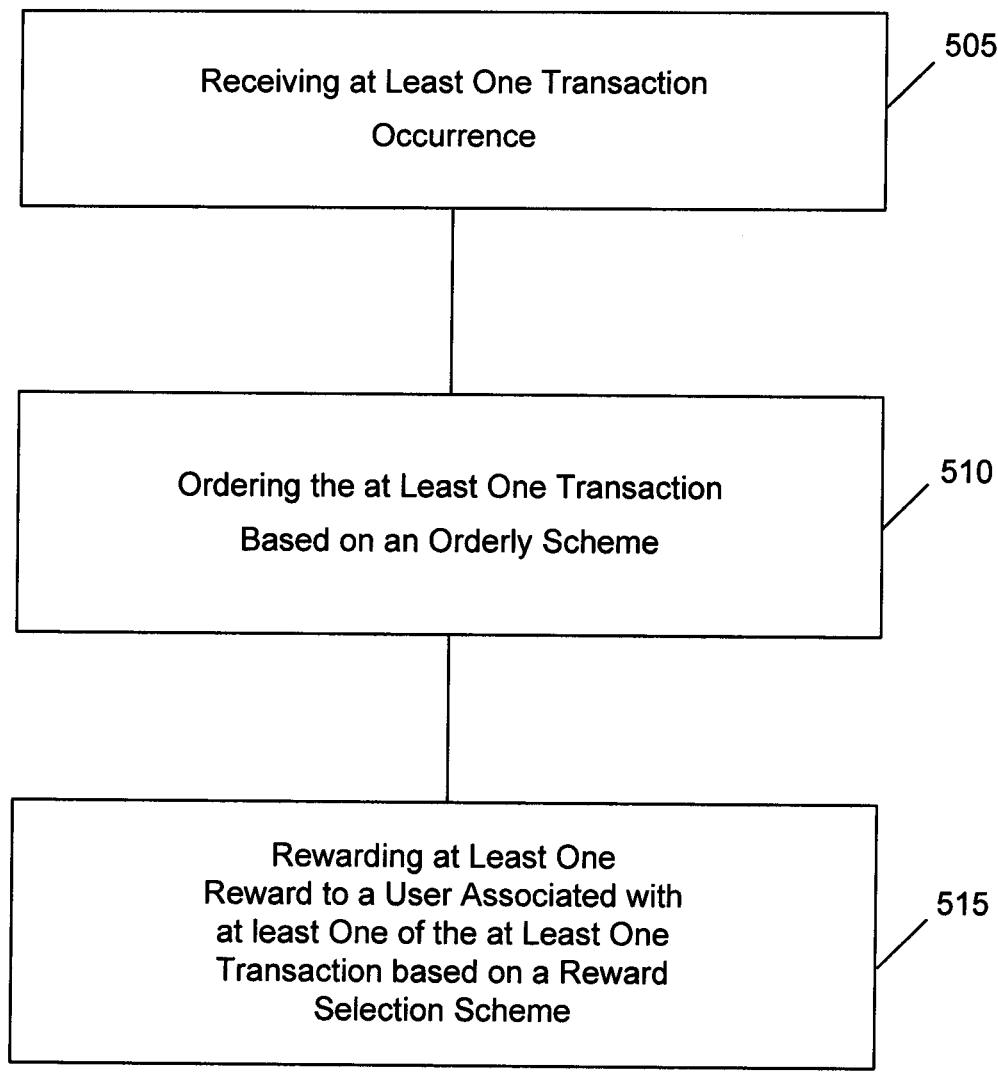
FIG. 5 illustrates an exemplary process flow 500 for offering rewards, according to various embodiments of the invention.

FIG. 5 illustrates a process flow 500 for offering rewards, according to an embodiment of the systems and methods described herein. As shown, process flow 500 may be performed by the various systems and methods described herein. At step 505, at least one transaction occurrence is received. In some embodiments, a transaction occurrence may comprise a purchase, funds transfer, deposit, withdrawal, balance inquiry, or any other transaction that may be conducted with cash, a card or other device, or an account. At step 510, the at least one transaction is ordered or prioritized according to an ordering or prioritization scheme, rule or algorithm. At step 515, at least one reward is rewarded to a user associated with the at least one of the at least one transaction based on a reward selection scheme, rule or algorithm.

Figure 6:
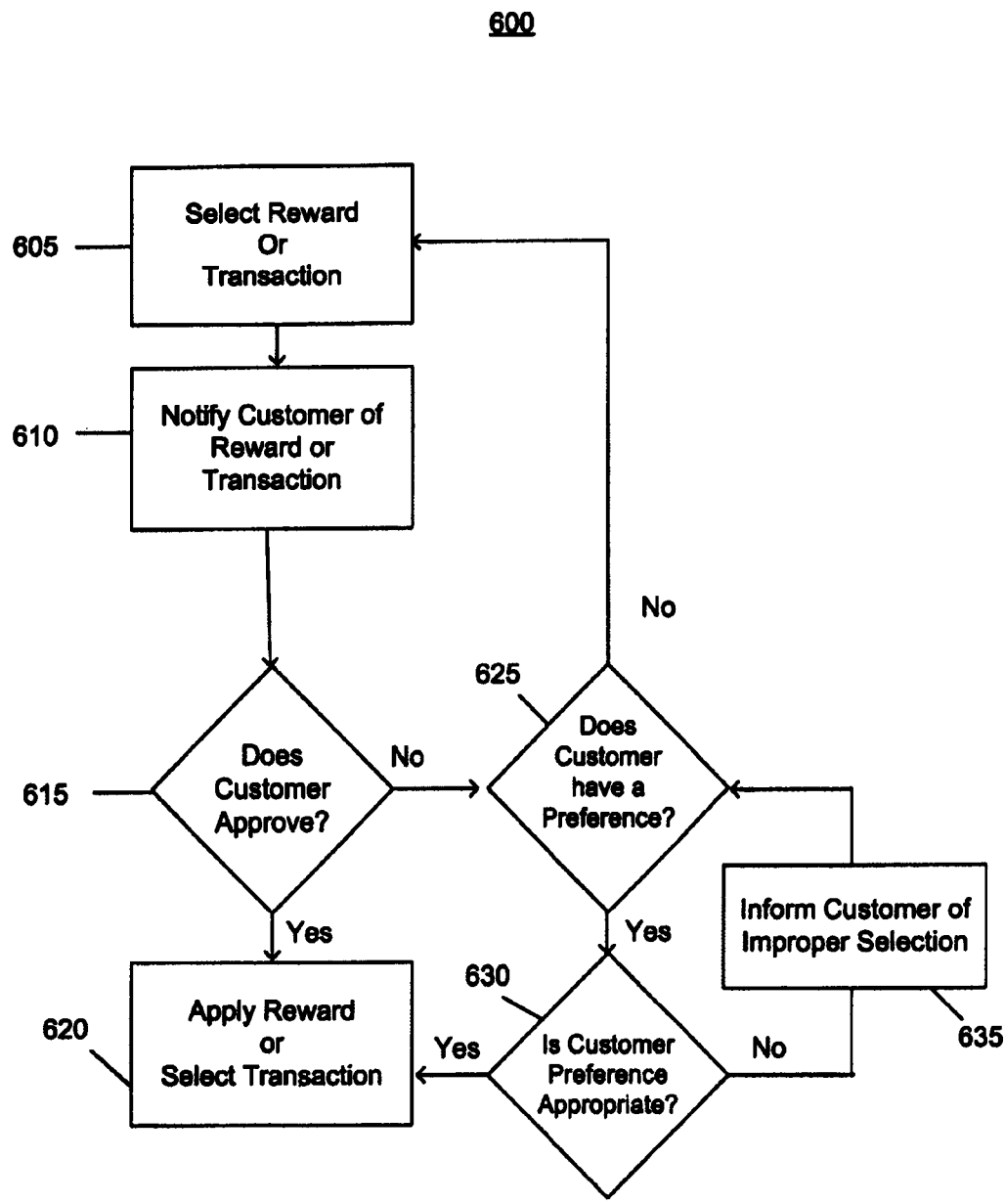
FIG. 6 illustrates an exemplary process flow 600 for offering rewards, according to various embodiments of the invention.

FIG. 6 illustrates a process flow 600 for offering rewards, according to an embodiment of the systems and methods described herein. At step 605, the various systems and methods described herein may select at least one reward or at least one customer or transaction that is to receive or redeem a reward. At step 610, a customer associated with the reward or the transaction that is to receive or redeem a reward may be notified of the selection. In some embodiments, the notification may be provided via a statement or catalog or other appropriate manner of communication. At step 615, a determination is made as to whether the customer approves, declines or requests a change or modification to the selected reward or transaction. For example, the customer may prefer that another reward or transaction be selected. In some embodiments, the customer's designation may be communicated via an interactive statement, catalog or other form of communication. If the customer approves of the reward and transaction, then the systems and methods described herein may proceed to apply the selected reward to the selected transaction. If the customer disapproves, or requests a change or modification to either the selected reward or transaction, then a determination is made at step 625 as to whether the customer has a preference for either a reward or a transaction. If not, then the process proceeds to 605 where another reward or transaction is selected. The process continues until such time as the customer approves of the selected reward and transaction.

If, however, the customer does have a preference at step 625, then a determination is made at step 630 on whether the preference is appropriate. In some embodiments, determining whether a reward or transaction selection of the customer is proper may comprise determining whether the selection conforms with applicable parameters that set forth or limit the types of transactions or rewards that are available to the customer. Other parameters are possible. If the preference is appropriate, then the reward is applied to the transaction—either of which may be selected by the customer—at step 620. If the preference is not proper, then the customer is so informed and the process proceeds to step 625 until such time as a proper preference or selection is put forward, either by the customer or the systems or methods described herein.

The embodiments of the present inventions are not to be limited in scope by the specific embodiments described herein. For example, although many of the embodiments disclosed herein have been described with reference to rewards programs, the principles herein are equally applicable to the any type of program, rewards or otherwise, that may enroll customer or users. In addition, although many of the embodiments disclosed herein have been described with reference to a rewards station that is associated with a card or account issuer, such as a bank, for example, it should be appreciated that various aspects of the invention may be accomplished when various system components are located elsewhere. For instance, the rewards station described herein may be maintained and administered by a third party service provider. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims.

Further, although the embodiments of the present inventions have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. In some embodiments, for example, a merchant may use the systems and methods described herein to offer rewards in the manner described. For example, a particular electronics retailer may initiate a promotion wherein a customer entering into a transaction with a card, account, or cash, for example, may be selected to receive the good or service purchased for free. That is, the various systems and methods described herein may provide a platform for merchants to provide reward programs and other like incentives. Accordingly, the claims set forth below should be construed in view of the full breadth and spirit of the embodiments of the present inventions as disclosed herein.

What is claimed is:

1. A method for offering rewards, comprising the steps of:
  electronically receiving, by at least one computer processor, a plurality of transaction occurrences from a plurality of merchants relating to at least one account wherein the plurality of transaction occurrences comprise purchases;
  ordering, by the at least one computer processor, the plurality of transaction occurrences based on an ordering scheme;

selecting, by the at least one computer processor, a winning transaction, for a winning reward, from the plurality of transaction occurrences based on a selection scheme applied to the plurality of transaction occurrences; and receiving, by the at least one computer processor, from a user associated with the winning transaction, a designation of a reward or transaction to realize the winning reward;

rewarding, by the at least one computer processor, the user with the winning reward as designated.

2. The method of claim 1, wherein each of the plurality of transaction occurrence is consummated with a check, electronic funds transfer (EFT), cash, automated teller machine (ATM) transaction, or a credit, debit, gift, stored value, smart, or radio frequency identification (RFID) device or account.

3. The method of claim 1, wherein the purchases comprise a withdrawal, funds transfer, or deposit transaction.

4. The method of claim 1, wherein the ordering scheme is based on the date of the transaction occurrence, the amount of the transaction occurrence, the identity of a user associated with the transaction occurrence, or the identity of a merchant associated with the transaction occurrence.

5. The method of claim 1, wherein each of the steps of ordering and rewarding are performed periodically or randomly.

6. The method of claim 1, wherein the steps of ordering and rewarding are performed daily, weekly, monthly, bi-monthly, quarterly or according to another periodic time frame.

7. The method of claim 1, wherein the winning reward is changed or modified by the user.

8. The method of claim 1, wherein the winning transaction is changed or modified by the user.

9. The method of claim 1, wherein the ordered plurality of transaction occurrences receives a bonus reward based on an occurrence of a particular transaction in the ordered plurality of transaction occurrences.

10. A system for identifying and offering rewards, comprising:

a transaction reception processor for receiving a plurality of transaction occurrences, relating to at least one account, from a plurality of merchants wherein the plurality of transaction occurrences comprise purchases;

an ordering processor for ordering the plurality of transaction occurrences based on an ordering scheme; and a rewards selection processor for rewarding at least one reward to a user associated with at least one of the plurality of transaction occurrences based on a selection scheme applied to the plurality of transaction occurrences and for receiving, from the user, a designation of a reward or transaction to realize the at least one reward.

11. The system of claim 10, wherein each of the plurality of transaction occurrences is consummated with a check, electronic funds transfer (EFT), cash, automated teller machine (ATM) transaction, or a credit, debit, gift, stored value, smart, or radio frequency identification (RFID) device or account.

12. The system of claim 10, wherein each the purchases comprise a withdrawal, funds transfer, or deposit transaction.

13. The system of claim 10, wherein the ordering scheme is based on the date of the transaction occurrence, the amount of the transaction occurrence, the identity of a user associated with the transaction occurrence, or the identity of a merchant associated with the transaction occurrence.

14. The system of claim 10, wherein each of the steps of ordering and rewarding are performed periodically or randomly.

15. A method for offering rewards, comprising the steps of:

receiving, by at least one computer processor, a plurality of transaction occurrences from a plurality of merchants relating to a user or account wherein the plurality of transaction occurrences comprise purchases;

selecting, by the at least one computer processor, a winning transaction from the plurality of received transaction occurrences based on a selection scheme applied to the plurality of received transaction occurrences;

applying, by the at least one computer processor, at least one reward to the winning transaction; and receiving, by the at least one computer processor, from a user associated with the winning transaction, a designation of a reward or transaction to realize at least one reward.

* * * * *